United States Patent
Davis et al.

(10) Patent No.: US 8,756,030 B2
(45) Date of Patent: Jun. 17, 2014

(54) TIME CODE VALIDATION AND CORRECTION FOR PROXIMITY-BASED AD HOC NETWORKS

(75) Inventors: Marc E. Davis, San Francisco, CA (US); Joseph O'Sullivan, Oakland, CA (US); Christopher Paretti, San Francisco, CA (US); Christopher W. Higgins, Portland, OR (US)

(73) Assignee: Yahoo! Inc., Sunnyvale, CA (US)

( * ) Notice: Subject to any disclaimer, the term of this patent is extended or adjusted under 35 U.S.C. 154(b) by 663 days.

(21) Appl. No.: 12/028,607

(22) Filed: Feb. 8, 2008

(65) Prior Publication Data

US 2009/0204354 A1 Aug. 13, 2009

(51) Int. Cl.
| | |
|---|---|
| *G01D 18/00* | (2006.01) |
| *G01D 21/00* | (2006.01) |
| *G01P 21/00* | (2006.01) |
| *G01R 35/00* | (2006.01) |
| *G04F 1/00* | (2006.01) |
| *G04F 3/00* | (2006.01) |
| *G04F 5/00* | (2006.01) |
| *G04F 7/00* | (2006.01) |
| *G04F 8/00* | (2006.01) |
| *G04F 10/00* | (2006.01) |
| *G04G 5/00* | (2013.01) |
| *G04G 7/00* | (2006.01) |
| *G04G 15/00* | (2006.01) |
| *G06F 17/40* | (2006.01) |
| *H04W 4/02* | (2009.01) |

(52) U.S. Cl.
CPC ...................................... *H04W 4/02* (2013.01)
USPC .............................. 702/89; 702/176; 702/187

(58) Field of Classification Search
CPC ........ H04W 4/02; H04W 84/18; H04W 64/00; H04W 4/20
USPC ..................................................... 702/89, 187
See application file for complete search history.

(56) References Cited

U.S. PATENT DOCUMENTS

| | | | |
|---|---|---|---|
| 7,155,238 B2 | 12/2006 | Katz | |
| 7,310,335 B1* | 12/2007 | Garcia-Luna-Aceves et al. | 370/390 |
| 7,499,423 B1* | 3/2009 | Amos et al. | 370/324 |
| 7,680,154 B2* | 3/2010 | Stanton et al. | 370/507 |
| 2001/0010499 A1* | 8/2001 | Hopkins | 340/825.49 |
| 2001/0032335 A1* | 10/2001 | Jones | 725/105 |
| 2004/0008661 A1* | 1/2004 | Myles et al. | 370/350 |
| 2004/0062278 A1* | 4/2004 | Hadzic et al. | 370/503 |
| 2004/0208152 A1* | 10/2004 | Perkins et al. | 370/338 |
| 2006/0140135 A1* | 6/2006 | Bonta et al. | 370/254 |
| 2007/0037574 A1* | 2/2007 | Libov et al. | 455/435.2 |
| 2007/0073937 A1* | 3/2007 | Feinberg et al. | 710/62 |
| 2008/0253327 A1* | 10/2008 | Kohvakka et al. | 370/330 |

OTHER PUBLICATIONS

Nair, et al., "Bluetooth Pooling to Enrich Co-Presence Information", In: Adjunct Proceedings of the Seventh International Conference on Ubiquitous Computing (UbiComp 2005), 2005, 3 pages.

* cited by examiner

*Primary Examiner* — John Breene
*Assistant Examiner* — Manuel Rivera Vargas
(74) *Attorney, Agent, or Firm* — Berkeley Law & Technology Group, LLP

(57) ABSTRACT

A system and method is described herein for validating and correcting time codes generated by a plurality of sensors in a proximity-based ad hoc network. The time code information is used to correlate data produced by the sensors in a manner that is useful for location tracking. By validating and correcting the time codes, the system and method improves the integrity of such time code information and any location information generated therefrom.

22 Claims, 24 Drawing Sheets

TIME CODE VALIDATION AND CORRECTION FOR PROXIMITY-BASED AD HOC NETWORKS

BACKGROUND OF THE INVENTION

1. Field of the Invention

The present invention generally relates to systems and methods for validating and correcting time codes generated by devices in a network, such as devices in a proximity-based ad hoc network.

2. Background

Location-based services are services that provide location-specific content or assistance to users. Location-based services typically depend on the ability to track the location of a user device or object—a process that is sometimes referred to as positioning. Some examples of location-based services include personal navigation, resource location, resource tracking, proximity-based notification, location-based billing, and emergency services.

Various systems currently exist for automatically determining the location of a user device or object. These systems include, for example, the Global Positioning System (GPS), WiFi-based positioning systems, cellular telephony based positioning systems and Bluetooth™-based positioning systems. Each of these systems provides its own set of relative advantages and disadvantages. For example, GPS can provide extremely precise location estimates, but does not work well in indoor environments or in areas prone to multipath effects such as urban canyons. WiFi-based positioning systems work better than GPS in indoor environments but require that the user be within transmission range of a number of wireless access points in order to operate. Cellular telephony based and Bluetooth™-based positioning systems have their own advantages and disadvantages as well.

Although multiple types of positioning systems exist, networks and telecommunications carriers typically adopt only one type of system for the provision of location-based services. Thus, users of each network/carrier must live with the particular set of disadvantages associated with the type of positioning system that is adopted. This may include, for example, the generation of unreliable location information at certain times or under certain conditions or the generation of location information having limited or divergent granularity.

Furthermore, since different networks/carriers use different positioning technology, there is presently a lack of sophisticated location-based services for users that extend across multiple networks or carriers. Additionally, there exists no system that can advantageously connect and leverage these various sources of location information, each of which may be producing location information in a different manner and having a different format, to produce an improved or more comprehensive set of location information. Indeed, since the beacons associated with certain positioning systems (namely, WiFi-based, cellular telephony based, and Bluetooth™-based positioning systems) have very different transmission ranges and signal strengths, there is a strong incentive to maintain information generated by these systems in separate information silos.

What is needed, then, is a system and method that can leverage the information generated by a variety of different sensor-enabled devices and objects, included sensor-enabled devices/objects associated with different types of positioning systems and with different networks and carriers, to generate a database of real-time device/object locations that can be used for the provision of location-based services and other types of services. The desired system and method should advantageously be configured to leverage time codes embedded in the information generated by the sensor-enabled devices/objects to achieve this end. Furthermore, the desired system and method should advantageously be configured to validate and/or correct time codes generated by the sensor-enabled devices/objects to improve the integrity of such time code information and any location information generated therefrom.

BRIEF SUMMARY OF THE INVENTION

A system and method is described herein for validating and correcting time codes generated by a plurality of sensor-enabled devices and objects, wherein such time codes are used to establish a proximity-based ad hoc network among the devices/objects (referred to herein for simplicity as "sensors"). The system and method leverages information concerning the temporal and spatial proximity of sensors in the ad hoc network to perform this function. In one embodiment, collaborative filtering is applied to time codes generated by co-located sensors to validate and/or correct the time codes generated by those sensors. In another embodiment, geographic location information associated with or propagated among certain sensors in the ad hoc network is used to obtain a local time that can then be used to correct and validate time codes generated by co-located sensors. In either embodiment, the detection of an incorrect time code may be addressed by implementing a time code offset for a particular sensor and/or by automatically or manually modifying the state of a clock associated with the sensor.

In particular, a method for correcting time codes generated by a plurality of sensors is described herein. In accordance with the method, sensor data is received from each sensor in the plurality of sensors, wherein the sensor data received from each sensor includes a time code generated by the sensor. A proximity-based ad hoc network is then constructed among the plurality of sensors based on the received sensor data. The time codes generated by a group of spatially proximate sensors in the proximity-based ad hoc network are then analyzed. Based on the analysis, a time code generated by at least one sensor in the group is modified.

In accordance with the foregoing method, analyzing the time codes generated by the group may include assigning a confidence value to each of the time codes generated by the group. A confidence value may be assigned to a time code based at least in part on the number of sensors in the group that generated that time code and/or on an indicator of the reliability of a sensor that generated that time code. Modifying a time code generated by at least one sensor in the group based on the analysis may include selecting one of the time codes generated by the group based on the confidence values and replacing a time code generated by at least one sensor in the group by the selected time code.

The foregoing method may further include applying an offset to subsequently-received time codes generated by the at least one sensor in the group, automatically modifying a state of a clock associated with the at least one sensor in the group, or notifying a user of the at least one sensor in the group that a state of a clock associated with the sensor should be modified.

A system is also described herein. The system includes a communications manager, a location tracking manager and a time code manager. The communications manager is configured to receive sensor data from each sensor in a plurality of sensors, wherein the sensor data received from each sensor includes a time code generated by the sensor. The location tracking manager configured to construct a proximity-based ad hoc network among the plurality of sensors based on the received sensor data. The time code manager configured to analyze the time codes generated by a group of spatially proximate sensors in the proximity-based ad hoc network and to modify a time code generated by at least one sensor in the group based on the analysis.

In the foregoing system, the time code manager may be configured to assign a confidence value to each of the time codes generated by the group, to select one of the time codes generated by the group based on the confidence values, and to replace a time code generated by at least one sensor in the group by the selected time code. The time code manager may be configured to assign a confidence value to each of the time codes generated by the group based at least in part on the number of sensors in the group that generated that time code or on an indicator of the reliability of a sensor that generated that time code.

The time code manager may be further configured to apply an offset to subsequently-received time codes generated by the at least one sensor in the group, to automatically modify a state of a clock associated with the at least one sensor in the group, or to notify a user of the at least one sensor in the group that a state of a clock associated with the sensor should be modified.

An additional method for correcting time codes generated by a plurality of sensors is also described herein. In accordance with the method, sensor data is received from each sensor in the plurality of sensors, wherein the sensor data received from each sensor includes a time code generated by the sensor. A proximity-based ad hoc network is then constructed among the plurality of sensors based on the received sensor data. A geographic location of a first sensor in the proximity-based ad hoc network is then determined and local time information is obtained based on the geographic location of the first sensor. The local time information is then used to correct a time code generated by a second sensor that is spatially proximate to the first sensor in the proximity-based ad hoc network.

The foregoing method may further include applying an offset to subsequently-received time codes generated by the second sensor, automatically modifying a state of a clock associated with the second sensor, or notifying a user of the second sensor that a state of a clock associated with the second sensor should be modified.

An additional system is described herein. The system includes a communications manager, a location tracking manager and a time code manager. The communications manager is configured to receive sensor data from each sensor in a plurality of sensors, wherein the sensor data received from each sensor includes a time code generated by the sensor. The location tracking manager is configured to construct a proximity-based ad hoc network among the plurality of sensors based on the received sensor data and to determine a geographic location of a first sensor in the proximity-based ad hoc network. The time code manager is configured to obtain local time information based on the geographic location of the first sensor and to use the local time information to correct a time code generated by a second sensor that is spatially proximate to the first sensor in the proximity-based ad hoc network.

In the foregoing system, the time code manager may be further configured to apply an offset to subsequently-received time codes generated by the second sensor, to automatically modify a state of a clock associated with the second sensor, or to notify a user of the second sensor that a state of a clock associated with the second sensor should be modified.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
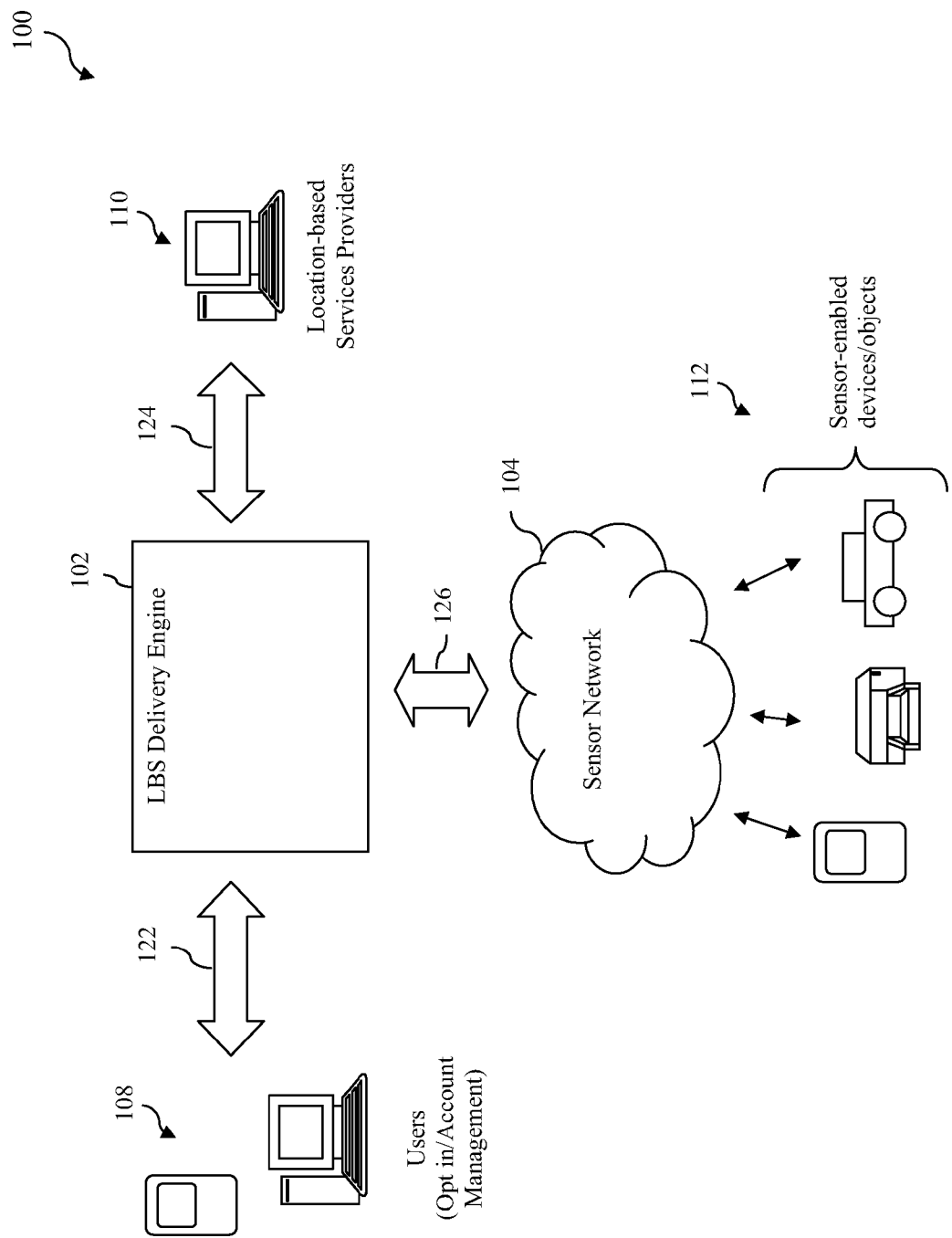
FIG. 1 is a high-level block diagram of a system for constructing a proximity-based ad hoc network and using the same for providing location-based services in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Example System Architecture

FIG. 1 is a high-level block diagram of an exemplary system 100 for constructing a proximity-based ad hoc network and using the same for providing location-based services in accordance with an embodiment of the present invention. As shown in FIG. 1, system 100 includes a location-based services (LBS) delivery engine 102 that is communicatively connected to users 108 via a first interface 122, to location-based service providers 110 via a second interface 124, and to a sensor network 104 via a third interface 126. Each of the elements of system 100 will now be briefly described, with additional details to be provided in subsequent sections.

First interface 122 is configured to allow users 108 to interact with LBS delivery engine 102 for the purpose of specifying whether or not they wish to "opt in" to receive location-based services from LBS delivery engine 102. First interface 122 may be further configured to allow a user to specify which location-based services should be provided to the user and to specify preferences concerning how such services should be delivered. First interface 122 may be still further configured to allow a consumer to specify preferences concerning the manner in which one or more sensor-enabled devices or objects associated with the user are to be tracked by LBS delivery engine 102. In one embodiment of the present invention, first interface 122 comprises an application programming interface (API) that can be used to build applications by which user systems/devices may interact with LBS delivery engine 102, although the invention is not so limited.

Second interface 124 is configured to allow location-based services providers 110 to interact with LBS delivery engine 102 for the purpose of providing location-specific services and/or content to registered users of LBS delivery engine 102. Second interface 124 may also be configured to perform other functions to be described in more detail herein. In one embodiment of the present invention, second interface 124 comprises an API that can be used to build applications by which systems owned or operated by location-based services providers may interact with LBS delivery engine 102, although the invention is not so limited.

LBS delivery engine 102 is a system that is configured to track the location of sensor-enabled devices and objects associated with users over time and to use this location information to support the provision of location-based services and content to those users. As will be described in more detail herein, LBS delivery engine 102 is configured to perform the location tracking function in part by receiving sensor data from sensor-enabled devices/objects 112 over sensor network 104 and by constructing a proximity-based ad hoc network among the sensor-enabled devices/objects 112 based on this sensor data. In one embodiment, the location-based services and content delivered by LBS delivery engine 102 are also delivered over sensor network 104, although this need not be the case.

Sensor-enabled devices/objects 112 are intended to represent any device or object that can include sensing technology, including but not limited to handheld user devices (e.g., mobile telephones, personal digital assistants, handheld computers, media players, handheld navigation devices, handheld scanners, cameras), vehicles (e.g., automobiles, airplanes, trucks, trains), office equipment (e.g., computers, printers, copiers), appliances, inventory, freight, parcels, or commercial products, to name only a few. The sensing technology may include but is not limited to WiFi sensing technology, cellular telephone sensing technology, Bluetooth™ sensing technology, or radio frequency identification (RFID) sensing technology.

Communication between LBS delivery engine 102 and sensor network 104 takes place over third interface 126. In one embodiment of the present invention, third interface 126 comprises an API that can be used to build applications by which sensor-enabled devices/objects 112 can communicate with LBS delivery engine 102, although the invention is not so limited.

Figure 2:
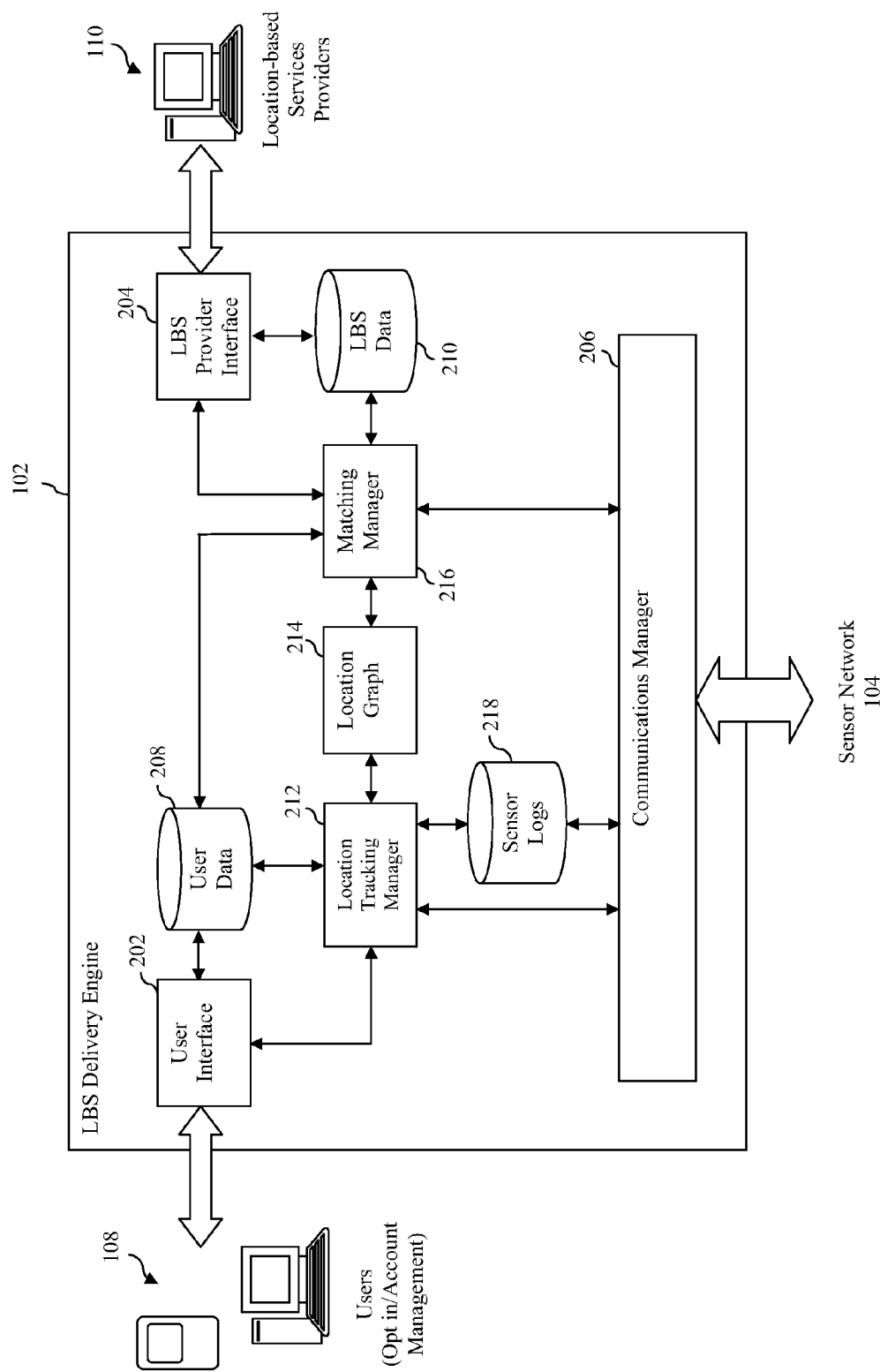
FIG. 2 is a block diagram of a location-based services (LBS) delivery engine in accordance with an embodiment of the present invention.

FIG. 2 depicts LBS delivery engine 102 in more detail. As shown in FIG. 2, LBS delivery engine 102 includes a number of communicatively-connected elements including a user interface 202, an LBS provider interface 204, a communications manager 206, a user data database 208, an LBS data database 210, a location tracking manager 212, a location graph 214, a matching manager 216, and a sensor logs database 218. Each of these elements will now be described.

1. User Interface 202

User interface 202 is a component that is configured to allow a user to interact with LBS delivery engine 102 from a remote location for the purpose of specifying whether or not the consumer wishes to receive location-based services from LBS delivery engine 102 and to optionally specify preferences concerning the manner in which such services are to be delivered. User interface 202 may also be configured to allow a user to provide information relating to the manner in which one or more devices or objects associated with the user are to be tracked by LBS delivery engine 102. Information provided by a user via user interface 202 is stored in user data database 208. User interface 202 may be implemented using a Web service and a standard set of Web APIs for utilizing the Web service. Web applications built upon the Web service may be published by an entity that owns and/or operates LBS delivery engine 102 or by other entities. Such Web applications are accessed by users using Web browsers in a well-known fashion.

The system/device used by the user to interact with user interface 202 may be one of sensor-enabled devices 112 depicted in FIG. 1 or some other system/device. In one embodiment, communication between users and user interface 202 occurs over the Internet. However, the invention is not so limited, and communication between users and user interface 202 may occur over any type of network or combination of networks including wide area networks, local area networks, private networks, public networks, packet networks, circuit-switched networks, and wired or wireless networks.

2. User Data Database 208

User data database 208 is configured to store data associated with particular users that is used by LBS delivery engine 102 to determine which location-based services should be provided to a particular user and the manner in which such services should be provided. To this end, user data database 208 includes a list of the location-based services that a user has registered to use and associated user preference information regarding how such services should be delivered.

User data database 208 is also configured to store user-provided information identifying one or more sensor-enabled devices or objects that are to be tracked by LBS delivery engine 102 for the purposes of determining device/object location(s) and receiving services based on those location(s). User data database 208 may also be configured to store user preferences concerning how and when such sensor-enabled devices/objects are to be tracked.

User data database 208 may also be configured to store other data about a user that can be used to perform targeted delivery of location-based services or content to the user, such as data relating to a user's identity, activities, interests, preferences, or social network. This data may be actively provided by a user (such as via user interface 202), collected from sensor-enabled devices 112 via sensor network 104 or some other channel, provided to LBS delivery engine 102 from some other network, system or database that aggregates such data, or by any combination of the foregoing. An example of a system that uses a sensor network to collect user data of this type is described in commonly-owned, co-pending U.S. patent application Ser. No. 11/562,976, entitled "Methods, Systems and Apparatus for Delivery of Media," the entirety of which is incorporated by reference herein.

3. LBS Provider Interface 204

LBS provider interface 204 is a component that is configured to allow location-based service providers, and their systems, to interact with LBS delivery engine 102 from a remote location for the purpose of creating or otherwise providing location-based content or services for distribution to users as well as to perform other functions. Such other functions may include specifying targeting criteria that are used to match location-based content or services to users. Information provided by a location-based service provider through interaction with LBS provider interface 204 is stored in LBS data database 210.

In one embodiment, electronic content and other data necessary for providing a location-based service is provided or created by a location-based services provider via LBS provider interface 204 and stored in LBS data database 210. This data may then be used by LBS delivery engine 102 to automatically create and deliver location-based content or services to users based on the current location of sensor-enabled devices/objects associated with the users. For example, if the location-based content included a location-specific advertisement, the advertisement could be stored in LBS data database 210 and then delivered to users when such users carry mobile devices through or near a particular location. However, this example is not intended to be limiting and persons skilled in the relevant art(s) will readily appreciate that a wide variety of electronic content and other data may be stored in LBS data database 210 to support the delivery of location-based services.

In an alternate embodiment, a location-based service provider provides location-based content and services in real-time to LBS delivery engine 102 via LBS provider interface 204 for delivery to users based on the location of sensor-enabled devices/objects associated with the users as determined by LBS delivery engine 102. In this case, LBS delivery engine 102 is not responsible for generating or accessing location-based content from LBS data database 210—rather, such content is provided directly from the location-based service provider. In a still further embodiment, location-based content and services may be provided using a combination of content and data provided from the location-based services provider and from LBS data database 210.

Location-based services that may be provided by LBS delivery engine 102 in this manner include, but are not limited to, personal navigation services, resource location (e.g., providing an identification of a local business, professional, or service, such as an ATM, doctor or restaurant, responsive to a user query), resource tracking (e.g., tracking of objects such as packages and train boxcars), resource tracking with dynamic distribution (e.g., fleet scheduling and tracking of taxis, service people, rental equipment, doctors, etc.), proximity-based notification (e.g., alerts or notices, such as notification of a sale on gas, warning of a traffic jam, or co-presence of an actual or potential business or social contact), location-based content delivery (e.g., local weather, targeted advertising or coupons), location-based billing (e.g., EZ pass and toll watch), and emergency services. Persons skilled in the relevant art(s) will appreciate that other location-based services not listed here may also be delivered using LBS delivery engine 102.

In one embodiment of the present invention, location-based service providers and their systems communicate with LBS provider interface 204 using applications built upon a predefined API. Such applications may be published by an entity that owns and/or operates LBS delivery engine 102 or by other entities. Communication between the location-based service providers and LBS provider interface 204 may occur over the Internet. However, the invention is not so limited, and communication between the location-based service providers and LBS provider interface 204 may occur over any type of network or combination of networks including wide area networks, local area networks, private networks, public networks, packet networks, circuit-switched networks, and wired or wireless networks.

4. LBS Data Database 210

As noted above, certain information provided by a location-based service provider through interaction with LBS provider interface 204 is stored in LBS data database 210. This information may include, for example, data about each location-based service provider that has registered to use LBS delivery engine 102 as well as electronic content and other data related to or necessary for providing one or more location-based services.

5. Communications Manager 206

Communications manager 206 is a component that is configured to manage all communication between LBS delivery engine 102 and sensor-enabled devices/objects 112 residing on or currently connected to sensor network 104. Communications manager 206 is configured to perform, among other functions, the transmission of location-based content and other data associated with location-based services to sensor-enabled devices 112 over sensor network 104. Communications manager 206 is also configured to receive sensor data from sensor-enabled devices/objects 112 and store it in a sensor logs database 218 for use in performing location tracking functions by LBS delivery engine 102. Depending upon the implementation, communications manager 206 may also be configured to interoperate with third party carriers and networks to effect communications.

6. Sensor Logs Database 218

As noted above, sensor data received from sensor-enabled devices/objects 112 is stored in sensor logs database 218. This sensor data is then used by location tracking manager 212 to construct and/or update a proximity-based ad hoc network used to track the location of the sensor-enabled devices/objects 112.

As will be described in more detail herein, this sensor data may include a unique identifier (ID) of the reporting sensor-enabled device/object 112, one or more unique IDs corresponding respectively to one or more beacons sensed by the reporting sensor-enabled device/object and one or more time codes indicating when each of the one or more beacons was respectively sensed by the reporting sensor-enabled device/object. Other information that may be provided as part of the sensor data may include a signal strength associated with each of the one or more beacons and a time of transmission of the sensor data from the reporting sensor-enabled device/object to LBS delivery system 102. The sensor data may still further include metadata associated with the reporting sensor-enabled device/object, such as location information or other information associated with the reporting sensor-enabled device/object.

7. Location Tracking Manager 212

Location tracking manager 212 is a component that is configured to use sensor data from sensor logs database 218 to construct and/or update a proximity-based ad hoc network used to track the location of the sensor-enabled devices/objects 112. The manner in which location tracking manager 212 operates to perform this function will be described in detail below. Once location tracking manager 212 has determined the current relative or actual location of a sensor-enabled device/object, it uses that information to map the sensor-enabled device/object into a location graph 214 that represents all sensor-enabled devices/objects being tracked by LBS delivery engine 102 and their current locations.

8. Matching Manager 216

Matching manager 216 is a component that is configured to match information concerning the current location of one or more sensor-enabled devices/objects associated with a user, as determined from location graph 214, to a location-based service being provided to that user, so that the location-based service can take into account such location information. Matching manager 216 is further configured to provide location-based content or other information to the user, wherein such content or other information takes into account the current position of the sensor-enabled device(s)/objects(s). In one embodiment, matching manager 216 performs this function by selecting or customizing content from LBS data database 210 and transmitting it to the user while, in another embodiment, matching manager 216 performs this function by receiving content from a location-based service provider via LBS provider interface 204 and transmitting it to the user. In either case, any resulting communication to the user is transmitted over sensor network 104 via communications manager 206.

Matching manager 216 may also be configured to take into account other information about a user when determining whether or not to provide location-based content or other information to a user. This information may include, for example, data relating to a user's identity, activities, interests, preferences, or social network. Matching manager 216 may access this data from user data database 208.

B. Location Tracking in Accordance with an Embodiment of the Present Invention As discussed above, location tracking manager 212 within LBS delivery engine 102 constructs a proximity-based ad hoc network among a plurality of sensor-enabled devices and objects to track the location of such sensor-enabled devices and objects (referred to hereinafter for simplicity as "sensors"). In particular, location tracking manager 212 uses time-coded data received from each of the sensors to determine a current proximity of each of the sensors to one or more beacons. As used herein, the term beacon broadly refers to any unique device or object that is discoverable or detectable by a sensor. Then, by leveraging information relating to the effective transmission ranges of the beacons, location tracking manager 212 determines the relative location of each of the plurality of sensors with respect to other sensors within the plurality of sensors. Where actual (as opposed to relative) location information is available for a particular sensor, it can then be used to generate or augment location information associated with other sensors known to be spatially and temporally proximate to the particular sensor. The current location information for each of the sensors is then mapped to location graph 214 for use in providing location-based services.

Figure 3:
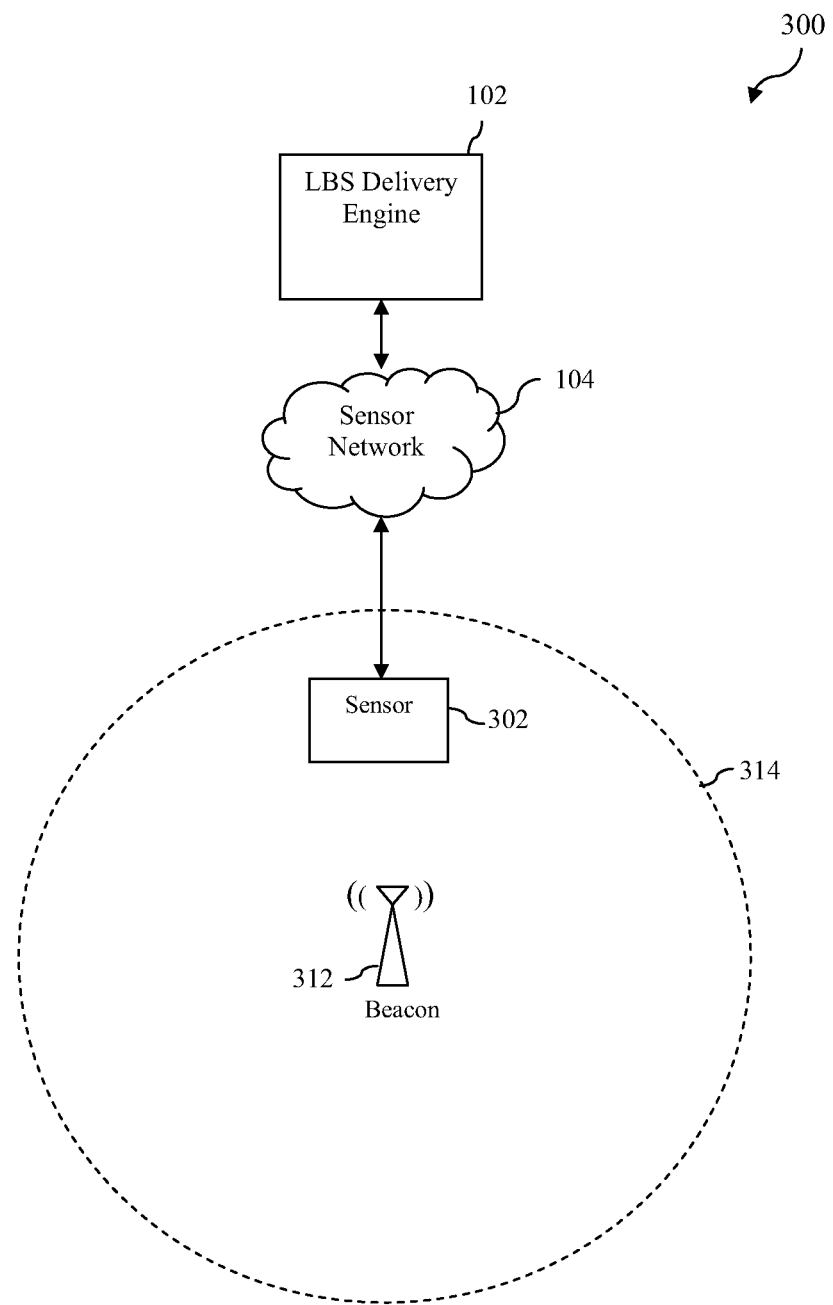
FIG. 3 is a block diagram of a scenario in which a sensor transmits sensor data associated with the detection of a single beacon to an LBS delivery engine in accordance with an embodiment of the present invention.

FIG. 3 is a block diagram 300 of a scenario in which a sensor 302 transmits sensor data associated with the detection of a single beacon 312 to LBS delivery engine 102. As shown in FIG. 3, sensor 302 has entered into or resides in a current transmission range 314 of beacon 312 and is therefore capable of detecting transmissions from beacon 312. Responsive to detecting beacon 312, sensor 302 sends sensor data to LBS delivery engine 102 via sensor network 104. In an embodiment, this sensor data includes: a unique ID of sensor 302, a unique ID of beacon 312 and a time code indicating when beacon 312 was sensed by sensor 302. The sensor data may also include the signal strength of beacon 312 as detected by sensor 302, if such information is available, and a time code indicating when the sensor information was transmitted from sensor 302 to LBS delivery system 102. The sensor data may still further include metadata associated with sensor 302, such as location information (e.g. location information generated by GPS or some other positioning module or user-entered location information) or other information associated with sensor 302.

Sensor 302 and beacon 312 may comprise any of a wide variety of well-known sensor and beacon types. For example, sensor 302 may comprise a first WiFi device and beacon 312 may comprise a second WiFi device, wherein the first WiFi device is capable of detecting the second WiFi device in a well-known manner. Each of the first and second WiFi devices may comprise, for example, a WiFi user device or access point. As will be appreciated by persons skilled in the relevant art(s), WiFi refers to wireless networking technology built around the family of IEEE 802.11 standards. Conventional WiFi devices typically have a transmission range from 0 up to approximately 100 meters. A typical WiFi device can act as both a sensor and a beacon, so it is possible that beacon 312 is also capable of detecting other WiFi devices and of reporting related sensing information to LBS delivery engine 102. WiFi devices can be either stationary or mobile, so sensor 302 and beacon 312 may also be stationary or mobile in this case.

As another example, sensor 302 may comprise a cellular telephone and beacon 312 may comprise a cellular tower, wherein the cellular telephone is capable of detecting the cellular tower in a well-known manner. A conventional cellular tower has a transmission range from 0 up to approximately 10,000 meters. Cellular telephones are capable of being carried from location to location by a user while cellular towers are stationary, so in this case sensor 302 may be stationary or mobile while beacon 312 will be stationary.

As a further example, sensor 302 may comprise a first Bluetooth™ device and beacon 312 may comprise a second Bluetooth™ device, wherein the first Bluetooth™ device is capable of detecting the second Bluetooth™ device in a well-known manner. As will be appreciated by persons skilled in the relevant art(s), Bluetooth™ refers to an industrial standard for wireless personal area networks (PANs) that is based on specifications developed and licensed by the Bluetooth™ Special Interest Group. Conventional Bluetooth™ devices typically have a transmission range from 0 up to approximately 10 meters. A typical Bluetooth™ device can act as both a sensor and a beacon, so it is possible that beacon 312 is also capable of detecting other Bluetooth™ devices and of reporting related sensing information to LBS delivery engine 102. Bluetooth™ devices can be either stationary or mobile, so sensor 302 and beacon 312 may also be stationary or mobile in this case.

Table 1 below shows various sensor and beacon mobility use cases that may be supported by an embodiment of the present invention. In particular, each entry in Table 1 describes a sensor-beacon combination that can result in the generation and reporting of sensor data to LBS delivery engine 102.

TABLE 1

Sensor and Beacon Mobility Use Cases

| | |
|---|---|
| Stationary Sensor detects Stationary Beacon | Mobile Sensor detects Stationary Beacon |
| Stationary Sensor detects Mobile Beacon | Mobile Sensor detects Mobile Beacon |

In accordance with one embodiment of the present invention, LBS delivery engine 102 maintains information indicating whether one or more sensors or beacons are mobile or stationary, and uses such information to enhance the manner in which location tracking manager 212 constructs the proximity-based ad hoc network. Depending upon the implementation, this information may be obtained through manual user input or and/or is automatically determined by LBS delivery engine 102. Depending on how the automatic determination algorithm is implemented, periodic updates may be advisable to ensure that a sensor or beacon that was deemed stationary has not become mobile.

Depending on the sensor-beacon type, the unique IDs associated with sensor 302 and beacon 304 may be MAC addresses respectively associated with sensor 302 and beacon 304. This approach may be used, for example, where sensor 302 and beacon 304 are WiFi or Bluetooth™ devices. However, other methods of assigning unique IDs to sensor 302 and beacon 304 may be used.

Figure 4:
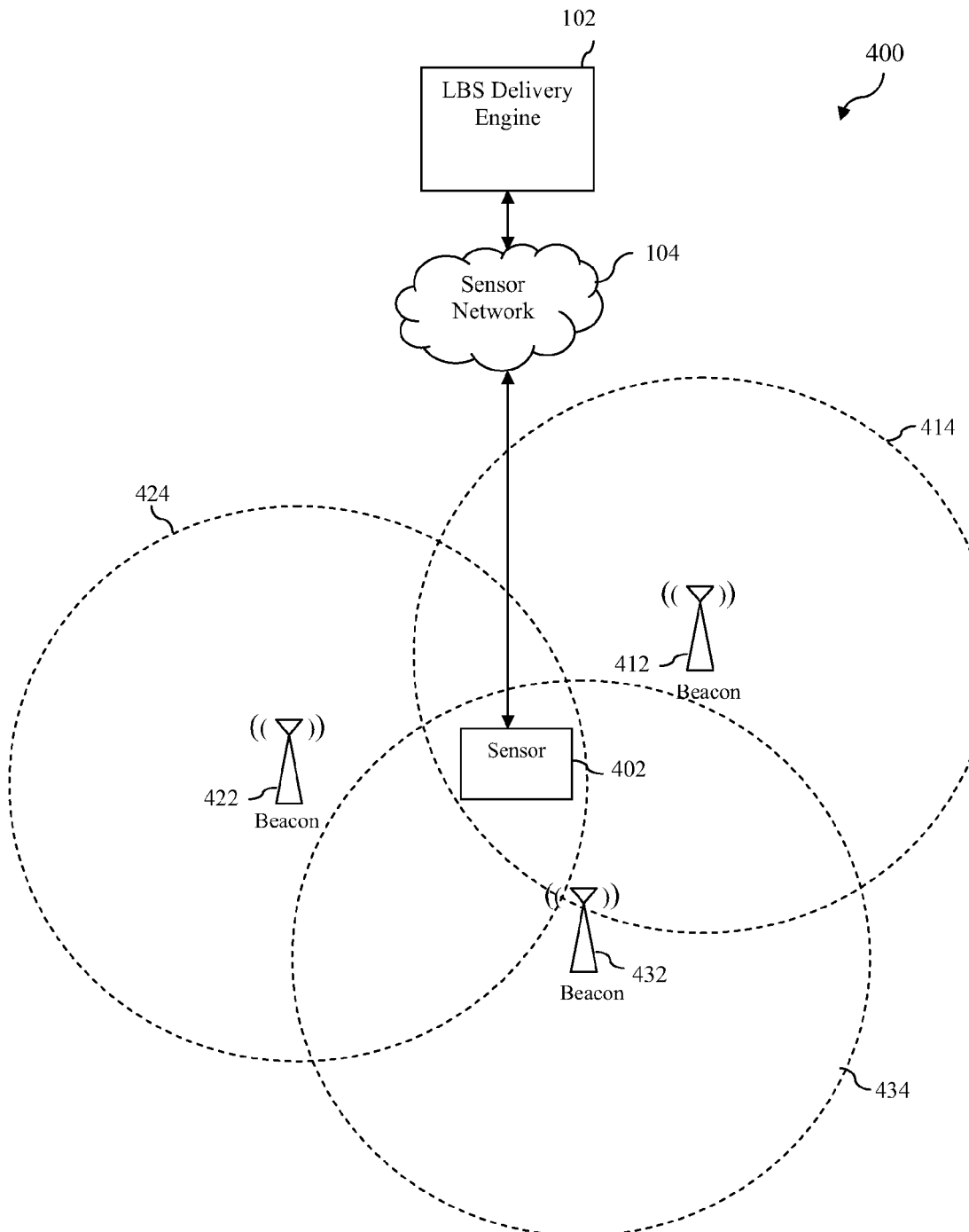
FIG. 4 is a block diagram of a scenario in which a sensor transmits sensor data associated with the detection of a plurality of beacons to an LBS delivery engine in accordance with an embodiment of the present invention.

FIG. 4 is a block diagram 400 of a scenario in which a sensor 402 transmits sensing information associated with the detection of a plurality of beacons to LBS delivery engine 102. As shown in FIG. 4, sensor 402 has entered into or resides in a current transmission range 414 of a first beacon 412, a current transmission range 424 of a second beacon 422, and a current transmission range 434 of a third beacon 432, and is therefore capable of detecting transmissions from all three beacons. Responsive to detecting all three beacons, sensor 402 sends sensor data to LBS delivery engine 102. In an embodiment, this sensor data includes: a unique ID of sensor 402, unique IDs respectively associated with each of first beacon 412, second beacon 422 and third beacon 432, and time codes indicating when each beacon was respectively sensed by sensor 402. The sensor data may also include the signal strength of each of the three beacons as detected by sensor 402, if such information is available, and a time code indicating when the sensor information was transmitted from sensor 402 to LBS delivery system 102. The sensor data may still further include metadata associated with sensor 402, such as location information (e.g. GPS location information) or other information associated with sensor 402.

Figure 5:
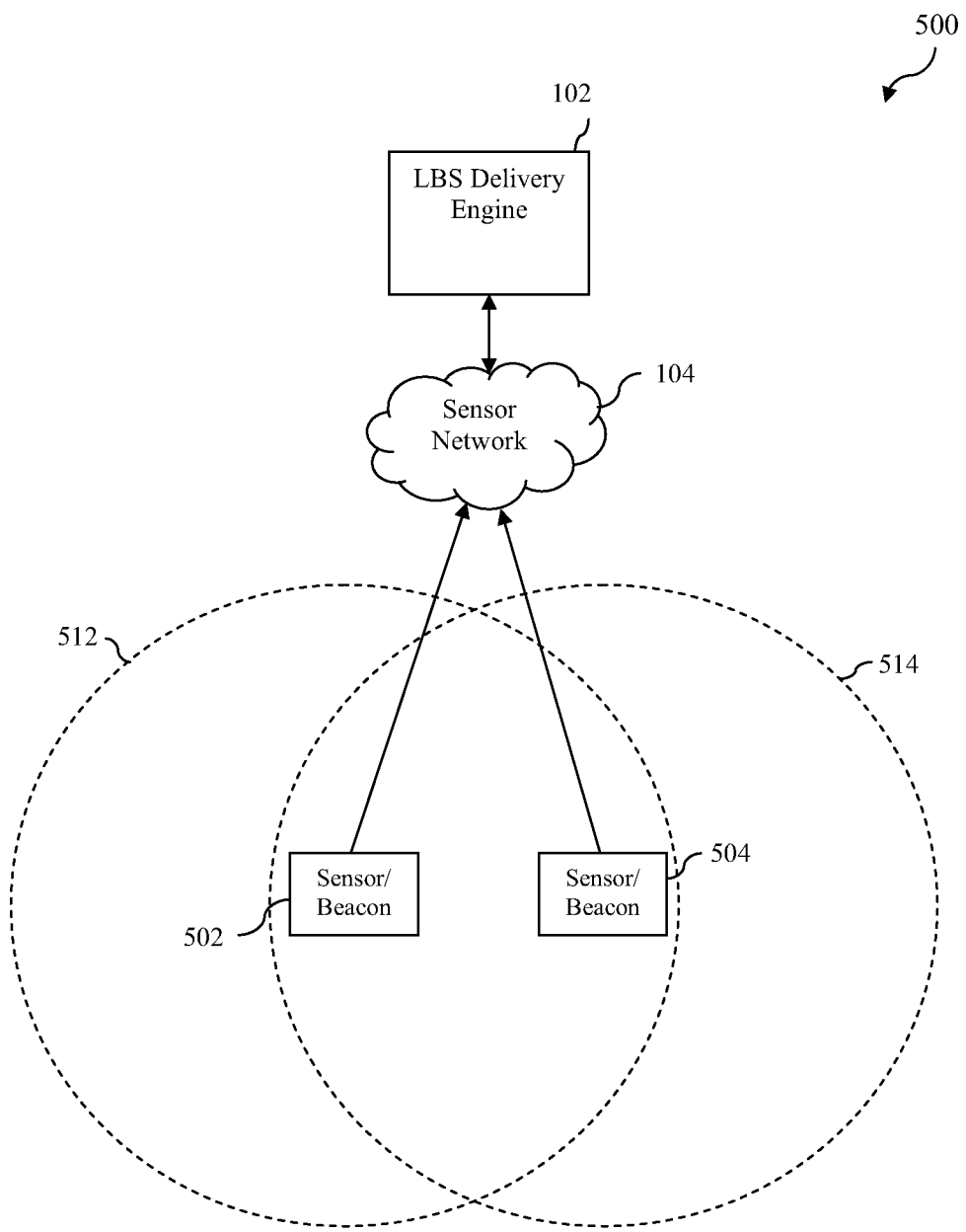
FIG. 5 is a block diagram of a scenario in which two devices/objects that act as both sensors and beacons detect each other and send sensor data to an LBS delivery engine responsive to such detection in accordance with an embodiment of the present invention.

FIG. 5 is a block diagram of a scenario in which devices or objects that are configured to act as both sensors and beacons detect each other and send sensor information to LBS delivery engine 102 responsive to such detection. As discussed above, WiFi devices and Bluetooth™ devices are examples of devices that can act both as sensors and beacons.

As shown in FIG. 5, sensor/beacon 502 has entered into or resides in a current transmission range 514 of sensor/beacon 504 and is therefore capable of detecting transmissions from sensor/beacon 504. Likewise, sensor//beacon 504 has entered into or resides in a current transmission range 512 of sensor/beacon 502 and is therefore capable of detecting transmissions from sensor/beacon 502. Responsive to detecting sensor/beacon 504, sensor/beacon 502 sends sensor data to LBS delivery engine 102 via sensor network 104 that includes a unique ID of sensor/beacon 502, a unique ID associated with sensor/beacon 504, and a time code indicating when sensor/beacon 504 was sensed by sensor/beacon 502, as well as other information as discussed in previous examples. Likewise, responsive to detecting sensor/beacon 502, sensor/beacon 504 sends sensor data to LBS delivery engine 102 via sensor network 104 that includes the unique ID of sensor/beacon 504, the unique ID of sensor/beacon 502, and a time code indicating when sensor/beacon 502 was sensed by sensor/beacon 504, as well as other information as discussed in previous examples.

Figure 6:
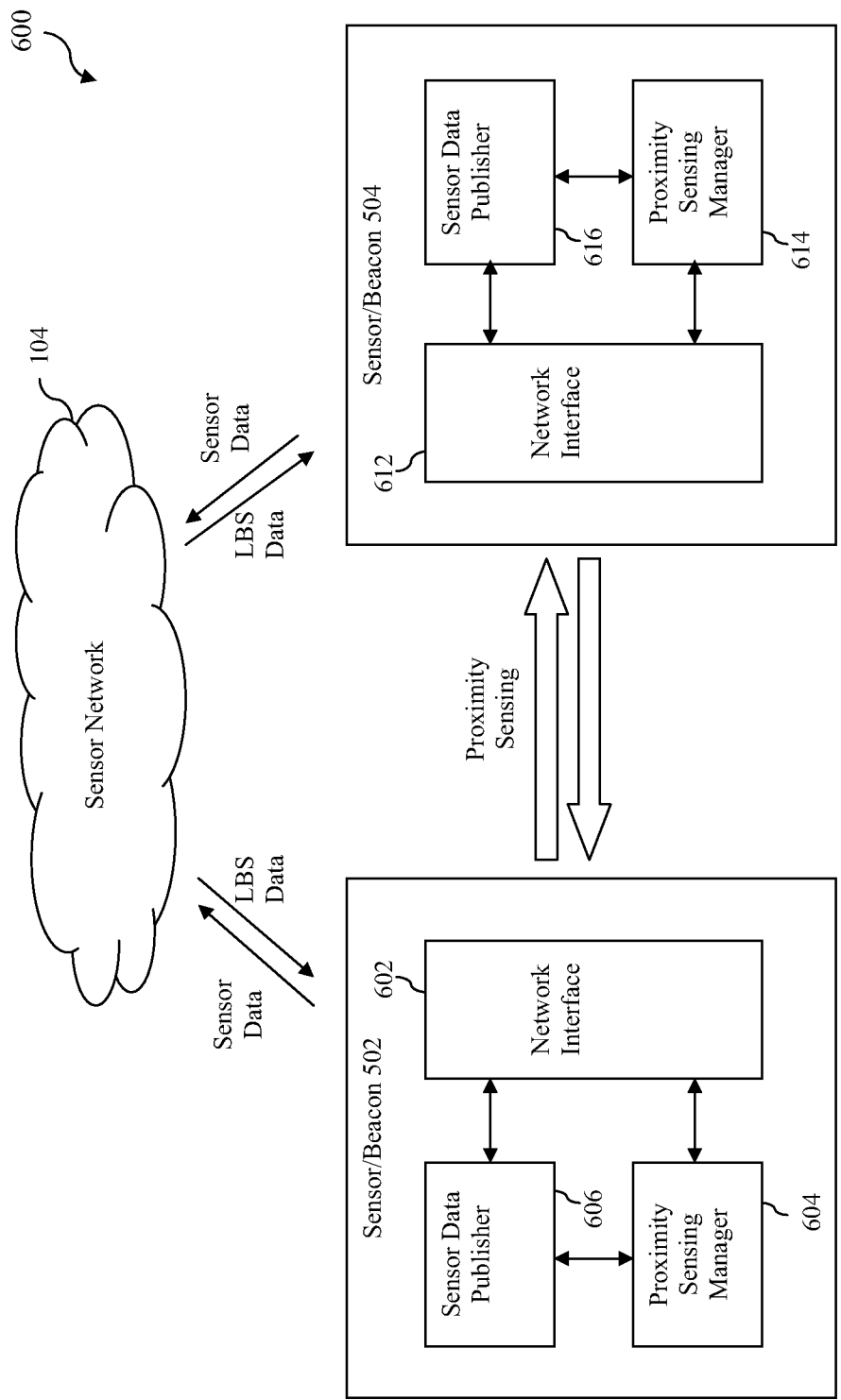
FIG. 6 is a block diagram that shows the two devices/objects of FIG. 5 in more detail.

FIG. 6 is a block diagram 600 that shows sensor/beacon 502 and sensor/beacon 504 in more detail. As shown in FIG. 6, sensor/beacon 502 includes a number of communicatively-connected components, including a network interface 602, a proximity sensing manager 604, and a sensor data publisher 606. Network interface 602 is configured to allow sensor/beacon 502 to transmit signals for detection by other proximally-located entities as well as to detect signals transmitted by other proximally-located entities. Network interface 602 is also configured to transmit sensor data to LBS delivery engine 102 (not shown in FIG. 6) via sensor network 104 and to receive data related to location-based services from LBS delivery engine 102. In an alternate embodiment, network interface 602 is used for proximity sensing while an additional network interface (not shown in FIG. 6) is used for communication with LBS delivery engine 102 over sensor network 104.

Proximity sensing manager 604 is configured to scan one or more wireless channels via network interface 602 in order to detect the transmissions of any proximally-located beacons. If a beacon is detected, proximity sensor manager 606 obtains a unique ID associated with the beacon (either from the originally-received beacon transmission or via a subsequent exchange of messages with the beacon) and optionally measures or otherwise obtains a signal strength associated with transmissions from the beacon. Proximity sensing manager 606 is also configured to generate a time code indicating a time at which the beacon was detected. Proximity sensing manager 606 is further configured to provide the IDs of the currently-sensed beacons, the associated time codes, and (optionally) the signal strength data to sensor data publisher 604. Proximity sensing manager 606 is configured to perform this scanning function, which is also referred to herein as "polling," on a periodic basis. In an embodiment, the frequency at which polling is performed may be controlled by modifying a configurable polling frequency parameter.

Depending upon the implementation, proximity sensing manager 604 may also provide additional information to sensor data publisher 606 concerning the currently-sensed beacons, such as the channel on which a beacon was sensed, an indication of beacon type, or an indication of directionality of a currently-sensed beacon.

Sensor data publisher 606 receives the foregoing information from proximity sensing manager 604 and accumulates it in a buffer for subsequent transmission to LBS delivery engine 102. Sensor data publisher 606 may add additional metadata to the information before sending it to LBS delivery engine 102. This additional metadata may include, for example, location information associated with sensor/beacon 502. Such location information may include, for example, location information provided by a GPS module or other positioning module within sensor/beacon 502. Alternatively, such location information may include location information (e.g., a zip code, street address, or the like) manually provided by a user of sensor/beacon 502 via a user interface of sensor/beacon 502 (not shown in FIG. 6). Such location information may further include event information manually provided by a user of sensor/beacon 502 from which a location may be inferred. Additionally, such location information may be obtained by mapping a user to a particular event (e.g., by accessing a user calendar or by some other means), wherein the event is associated with a particular location. Still further, such location information may include location information received by sensor/beacon 502 from another device via a local connection, wherein the local connection may be for example a Bluetooth™ link, an infrared link, or some other wired or wireless link.

Sensor data publisher 606 is configured to transmit this accumulated sensor data on a periodic basis to LBS delivery engine 102. In an embodiment, the frequency at which such reporting is performed may be controlled by modifying a configurable reporting frequency parameter.

Like sensor/beacon 502, sensor/beacon 504 also includes a number of communicatively-connected components, including a network interface 612, a proximity sensing manager 614, and a sensor data publisher 616. These components perform similar functions to network interface 602, proximity sensing manager 604 and sensor data publisher 606, respectively, as described above in reference to sensor/beacon 502.

Although FIG. 6 depicts two sensor/beacons 502 and 504 each of which is capable of sensing the other, it is noted that such proximity sensing need not be bi-directional. In other words, in alternate embodiments, sensor/beacon 502 may be capable of detecting sensor/beacon 504 or sensor/beacon 504 may be capable of detecting sensor/beacon 502, but not both. It is also noted that the foregoing functions of proximity sensing and reporting of sensor data as performed by each sensor/beacon 502 and 504 may advantageously be performed without pairing with the other device.

Figure 7:
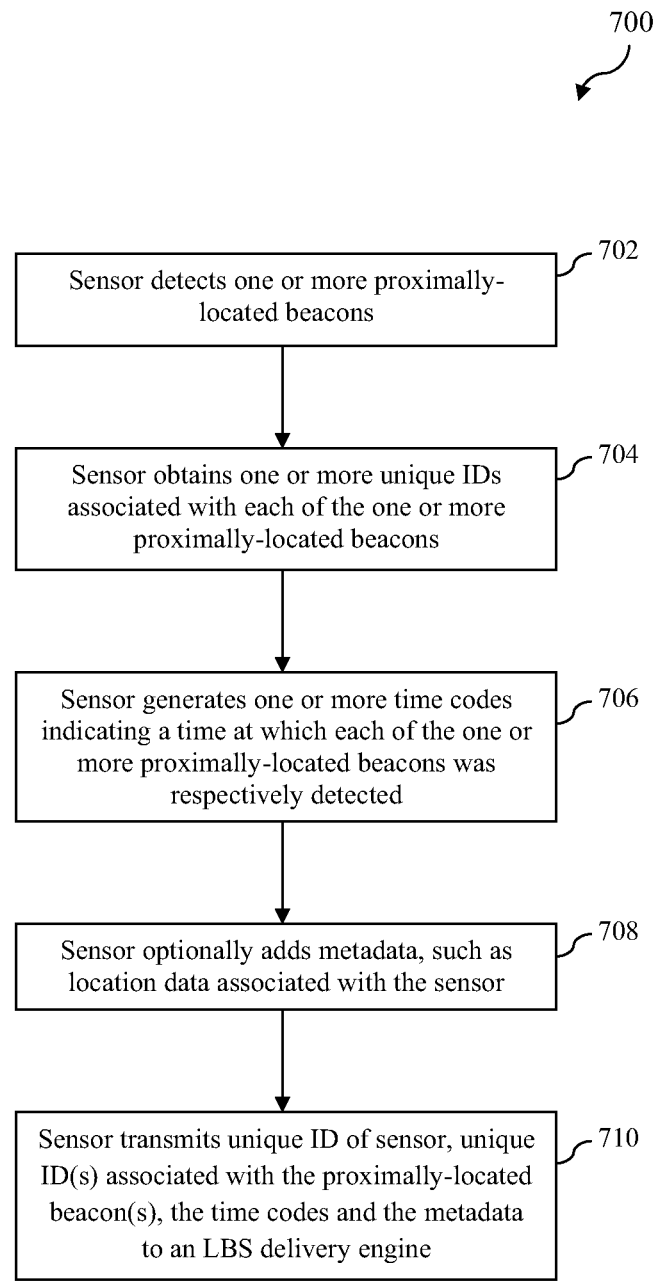
FIG. 7 illustrates a flowchart of an example method for reporting sensor data associated with the sensing one or more proximally-located beacons in accordance with an embodiment of the present invention.

FIG. 7 illustrates a flowchart 700 of an example method for reporting sensor data associated with the sensing one or more proximally-located beacons in accordance with an embodiment of the present invention. The method of flowchart 700 may be performed by any type of sensor or sensor/beacon including but not limited to any of the various types of sensors and sensor/beacons described herein and therefore should not limited to a particular structure or implementation.

As shown in FIG. 7, the method of flowchart 700 begins at step 702 in which a sensor detects one or more proximally-located beacons. Step 702 may occur responsive to the performance of a periodic polling function by the sensor as described above. At step 704, the sensor obtains one or more unique IDs respectively associated with each of the one or more proximally-located beacons. Step 704 may also include obtaining other information associated with each of the one or more proximally-located beacons, including but not limited to a signal strength associated with each of the one or more proximally-located beacons, a channel on which each beacon was sensed, an indication of each beacon type, or an indication of directionality of each currently-sensed beacon. At step 706, the sensor generates one or more time codes indicating a time at which each of the proximally-located beacons was respectively detected. At step 708, the sensor optionally adds metadata (including but not limited to sensor-generated or user provided location data) to the foregoing sensor data. At step 710, the sensor transmits a unique ID of the sensor, the unique ID(s) and other information associated with the proximally-located beacon(s), the time codes and the metadata to an LBS delivery engine. Step 710 may occur responsive to the performance of a periodic reporting function by the sensor as described above.

Figure 8:
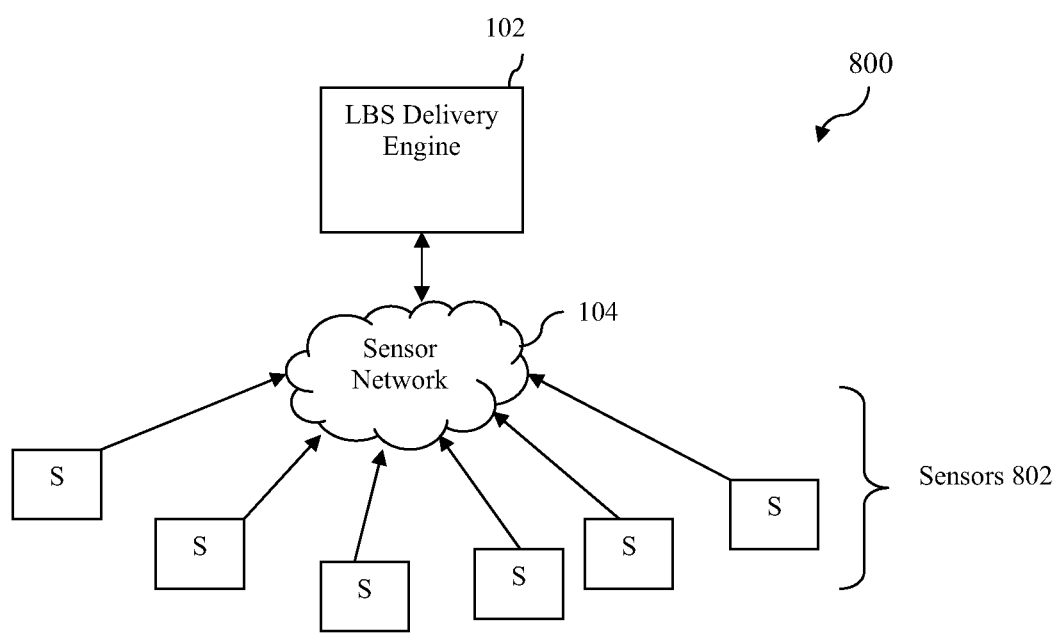
FIG. 8 is a block diagram of a system in accordance with an embodiment of the present invention in which a plurality of sensors periodically report sensor data to an LBS delivery engine.

Thus, in accordance with an embodiment of the present invention, numerous sensors (including sensors that also operate as beacons) provide sensor data to LBS delivery engine 102, wherein such sensor data identifies beacons that are currently detectable by each sensor and sensor/beacon. This is illustrated in FIG. 8, which shows a system 800 that includes a plurality of sensors 802 (shown as boxes labeled with an "S"), LBS delivery engine 102 and sensor network 104, wherein each sensor reports sensor data to LBS delivery engine 102 via sensor network 104. LBS delivery engine 102 uses such sensor data to determine the relative location of each sensor in plurality of sensors 802 with respect to the other sensors in plurality of sensors 802 and to construct a proximity-based ad hoc network among the plurality of sensors 802 based on such relative location information. LBS delivery engine 102 may advantageously perform this function by obtaining sensor data from a variety of different sensor types (e.g., WiFi, cellular, or Bluetooth™) and from sensors associated with different networks or telecommunications carriers.

Figure 9:
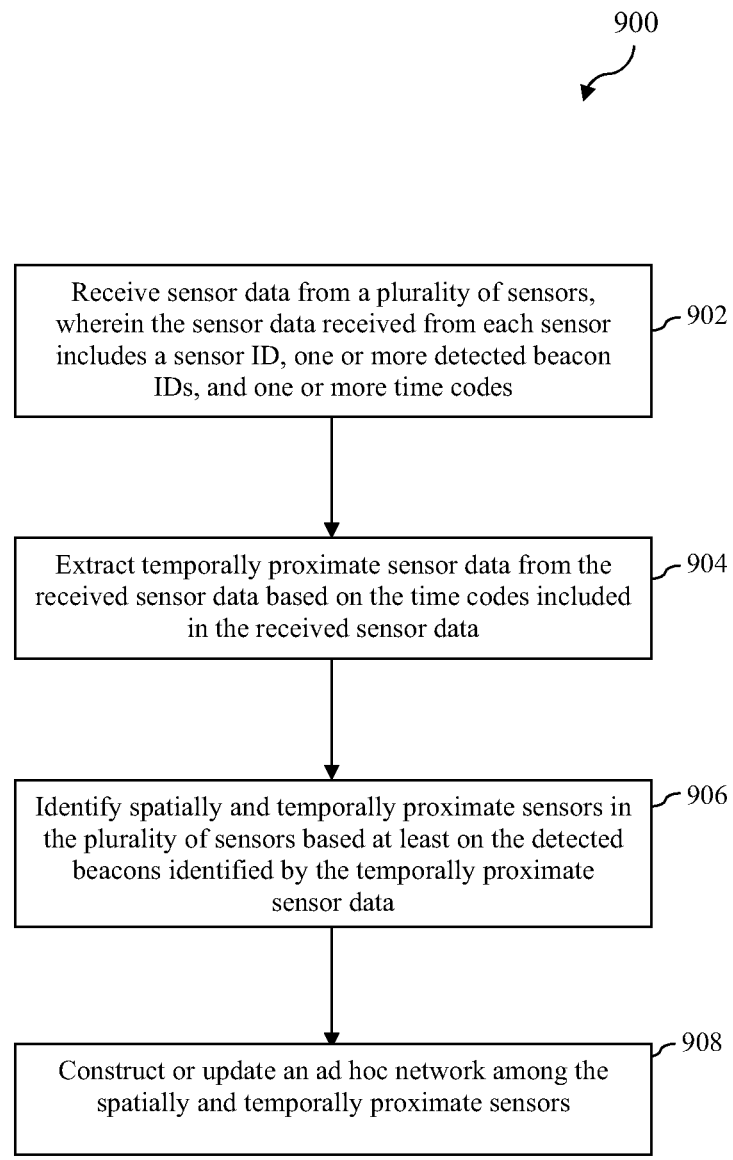
FIG. 9 illustrates a flowchart of a method for constructing a proximity-based ad hoc network in accordance with an embodiment of the present invention.

The manner in which LBS delivery engine 102 operates to construct a proximity-based ad hoc network based on the sensor data will now be described with reference to flowchart 900 of FIG. 9. As shown in FIG. 9, the method begins at step 902, in which communications manager 206 receives sensor data from a plurality of sensors, wherein the sensor data received from each of the plurality of sensors includes at least: a unique ID associated with the sensor, one or more unique IDs associated respectively with one or more beacons detected by the sensor, and one or more time codes indicating when each of the one or more beacons was respectively detected by the sensor. Communications manager 206 stores this sensor data in sensor logs database 218, where it is accessible by location tracking manager 212.

At step 904, location tracking manager 212 accesses sensor logs database 218 and extracts temporally proximate sensor data from the sensor data that was received in step 902. Location tracking manager 212 performs this function by extracting sensor data that corresponds to a unique detection time or detection time period. By identifying sensor data corresponding to a unique detection time or detection time period, location tracking manager 212 is able to obtain a subset of the received sensor data corresponding to a particular instance in time or to a particular time window. In an embodiment, this step is performed by analyzing the time codes associated with each set of sensor data, wherein each time code indicates a time that a particular beacon was identified by a particular sensor. Because the time codes may be generated by sensors using local sensor time, this step may also include normalizing the time codes. Normalizing the time codes may include, for example, converting each of the time codes to a system time.

At step 906, location tracking manager 212 identifies spatially and temporally proximate sensors in the plurality of sensors based on the detected beacons identified by the temporally proximate sensor data. This step may include, for example, comparing the beacons detected by each of the sensors at the same time or during the same time period to determine which sensors are proximate to each other. For example, if two sensors detect the same beacon as the same time or during the same time period, it can be assumed that the two sensors are temporally and spatially proximate. As another example, if two sensors that can also act as beacons detect each other at the same time or during the same time period, it can be assumed that the two sensors are temporally and spatially proximate.

The manner in which the temporally proximate sensor data is analyzed by location tracking manager 212 to perform the function of step 906 may vary depending on the implementation and the amount of sensor data available for each sensor. For example, the analysis performed by location tracking manager 212 may take into account other information provided as part of the sensor data in determining whether sensors are temporally and spatially proximate, such as the signal strength associated with each detected beacon, a beacon type, or an indication of directionality associated with each detected beacon. In determining temporal and spatial proximity, location tracking manager 212 may also utilize known information concerning the maximum transmission ranges associated with certain beacon types.

At step 908, location tracking manager 212 constructs or updates an ad hoc network among the spatially and temporally proximate sensors. The ad hoc network may be considered virtual in the sense that the sensors included in the network are not physically connected to each other, but instead are logically connected to each other by virtue of spatial and temporal relationships identified and maintained by location tracking manager 212.

Figure 10:
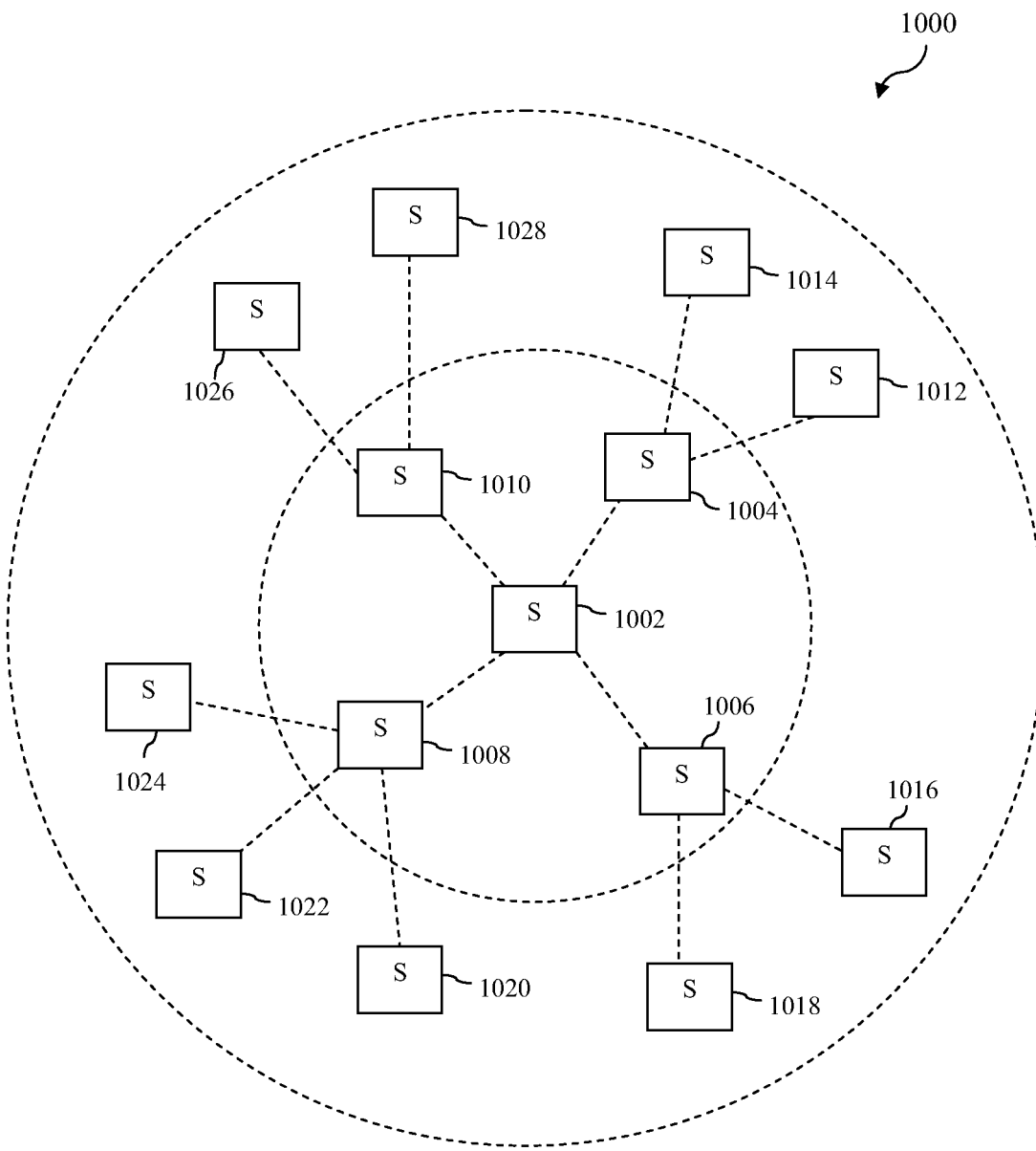
FIG. 10 is a conceptual illustration of how a proximity-based ad hoc network may be constructed in accordance with an embodiment of the present invention.

FIG. 10 is a conceptual illustration 1000 of how such an ad hoc network may be constructed. With reference to that figure, assume that location tracking manager 212 has determined that a sensor 1002 is spatially proximate to sensors 1004, 1006 and 1008 at a given point in time or during a given period of time. This relationship is represented by the dashed lines connecting those sensors as shown in FIG. 10. Assume also that location tracking manager has further determined that sensors 1004, 1006 and 1008 are each also spatially proximate to a plurality of other sensors (to which sensor 1002 is not connected) at that same point in time or during the same period of time. Then these relationships may also be represented by dashed lines connecting those sensors to further sets of sensors as shown in FIG. 10.

By analyzing the relationships in FIG. 10, then, it can be seen that sensor 1002 may also be spatially and temporally proximate to an additional number of sensors other than sensors 1004, 1006 and 1008 (i.e., any of sensors 1012, 1014, 1016, 1018, 1020, 1022, 1024, 1026 and 1028). In an embodiment of the present invention, location tracking manager 212 can leverage information concerning the transmission ranges of the beacons detected by each of these sensors (as well as other information such as beacon signal strength if available), to estimate the distance between sensor 1002 and the sensors to which it is connected only by virtue of its connections to sensors 1004, 1006 and 1008. The foregoing analysis may be repeated to identify sensors that are even further removed from sensor 1002 and to estimate the distance between sensor 1002 and such sensors. By applying this analysis to sensor 1002 and other sensors, an entire ad hoc network may be logically constructed.

Once an ad hoc network has been constructed (or updated if one version of the ad hoc network is being modified to generate a more current one), then location tracking manager 212 can advantageously use the ad hoc network to propagate location information among spatially and temporally proximate sensors. This feature will now be described in reference to flowchart 1100 of FIG. 11.

Figure 11:
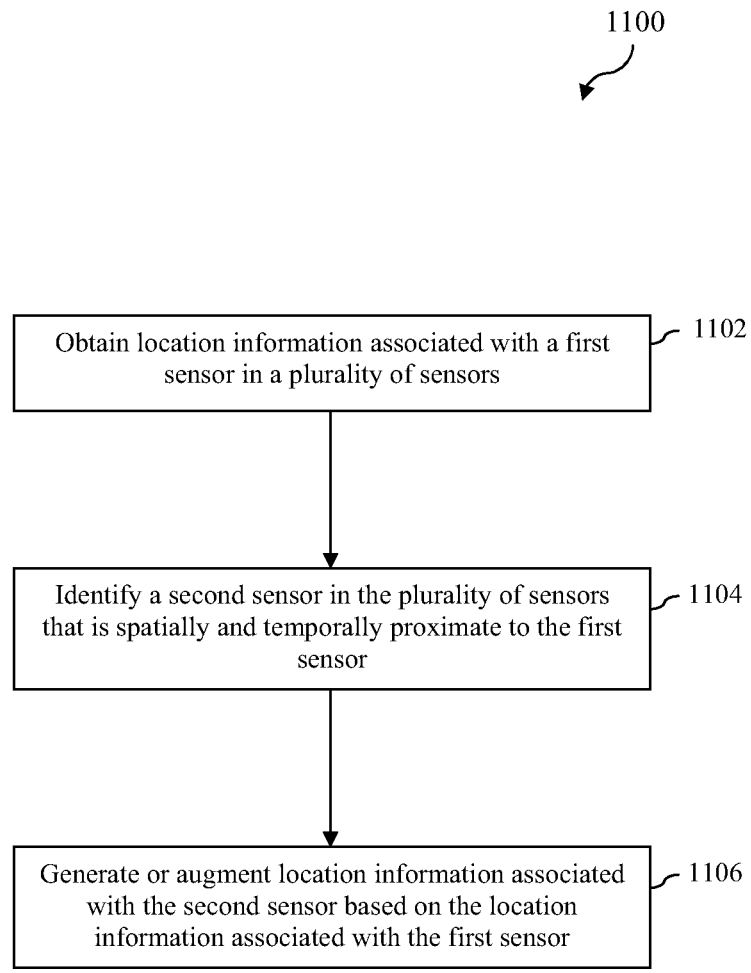
FIG. 11 illustrates a flowchart of a method for using a proximity-based ad hoc network to propagate location information among spatially and temporally proximate sensors in accordance with an embodiment of the present invention.

As shown in FIG. 11, the method of flowchart 1100 begins at step 1102 in which location tracking manager 212 obtains location information associated with a first sensor in a plurality of sensors represented in the proximity-based ad hoc network. The location information associated with the first sensor may include an estimate or indication of the actual location of the first sensor that is provided with the sensor data transmitted by the first sensor to LBS delivery system 102. This estimate or indication of the actual location of the first sensor may be generated by a positioning module or service present on the first sensor, such as but not limited to a GPS positioning module or service, a WiFi-based positioning module or service, a cellular telephone based positioning module or service, or a Bluetooth™-based positioning module or service. This estimate or indication of the actual location of the first sensor may also be provided by a user of the first sensor via a user interface of the first sensor. For example, the estimate or indication of the actual location of the first sensor may be a zip code or street address provided by the user of the first sensor.

Alternatively, location tracking manager 212 may obtain the location information associated with the first sensor by generating or augmenting location information associated with the first sensor based on location information associated with one or more other sensors in the plurality of sensors that have been determined to be spatially and temporally proximate to the first sensor. In other words, the location information associated with the first sensor may be propagated to the first sensor from one or more other spatially and temporally proximate sensors.

As yet another example, location tracking manager 212 may obtain the location information associated with the first sensor by accessing location information associated with a network gateway used by the first sensor. For example, as will be appreciated by persons skilled in the relevant art(s), IP addresses associated with geo-coded network gateways can be mapped to corresponding geographic areas.

Still further, location tracking manager 212 may obtain the location information associated with the first sensor by calculating the location of the first sensor by virtue of its proximity to a plurality of beacons. For example, triangulation may be used to calculate the location of the first sensor by virtue of its proximity to a plurality of beacons. The proximity of the first sensor to each of the beacons may be determined based on sensor data provided by the first sensor or by one or more sensors that have been determined to be spatially and temporally proximate to the first sensor.

At step 1104, location tracking manager 212 identifies a second sensor in the plurality of sensors that is spatially and temporally proximate to the first sensor. One manner by which location tracking manager 212 may identify spatially and temporally proximate sensors was described above in reference to flowchart 900 of FIG. 9.

At step 1106, location tracking manager 212 generates or augments location information associated with the second sensor based on the location information associated with the first sensor. Location tracking manager 212 may perform this step, for example, by using an estimate or indication of the actual location of the first sensor as an estimate or indication of the actual location of the second sensor. For example, if a zip code has previously been associated with the first sensor, then location tracking manager 212 may also associate the zip code with the second sensor based on the spatial and temporal proximity of the two sensors. The same approach may be used, for example, to assign geographic coordinates, a street address, or any other representation of a location associated with the first device to the second device.

Location tracking manager 212 may also perform step 1106 by modifying an estimate or indication of the actual location of the first sensor by an offset, wherein the offset is intended to represent the distance between the two sensors. For example, location tracking manager 212 may modify geographic coordinates representing the location of the first sensor to account for an estimated relative distance between the first sensor and the second sensor. As discussed above, the relative distance between sensors may be determined by leveraging sensor data, such as beacon IDs, beacon types, and signal strengths, provided by the plurality of sensors in the proximity-based ad hoc network.

Location tracking manager 212 may also perform step 1106 by augmenting location information previously-associated with the second sensor based on the location information associated with the first sensor. For example, the location information previously-associated with the second sensor may be limited or may lack the same granularity as the location information associated with the first sensor. In this case, location manager 212 may use the location information associated with the first sensor to render the location information associated with the second sensor more complete or granular. Thus, an embodiment of the present invention can combine location information from a plurality of spatially and temporally proximate sensors to generate refined location information.

The foregoing examples of the manner in which location tracking manager 212 may perform step 1106 were provided by way of example only and are not intended to limit the present invention. Persons skilled in the relevant art(s) will readily appreciate that other methods may be used to generate or augment location information associated with the second sensor based on the location information associated with the first sensor.

Figure 12:
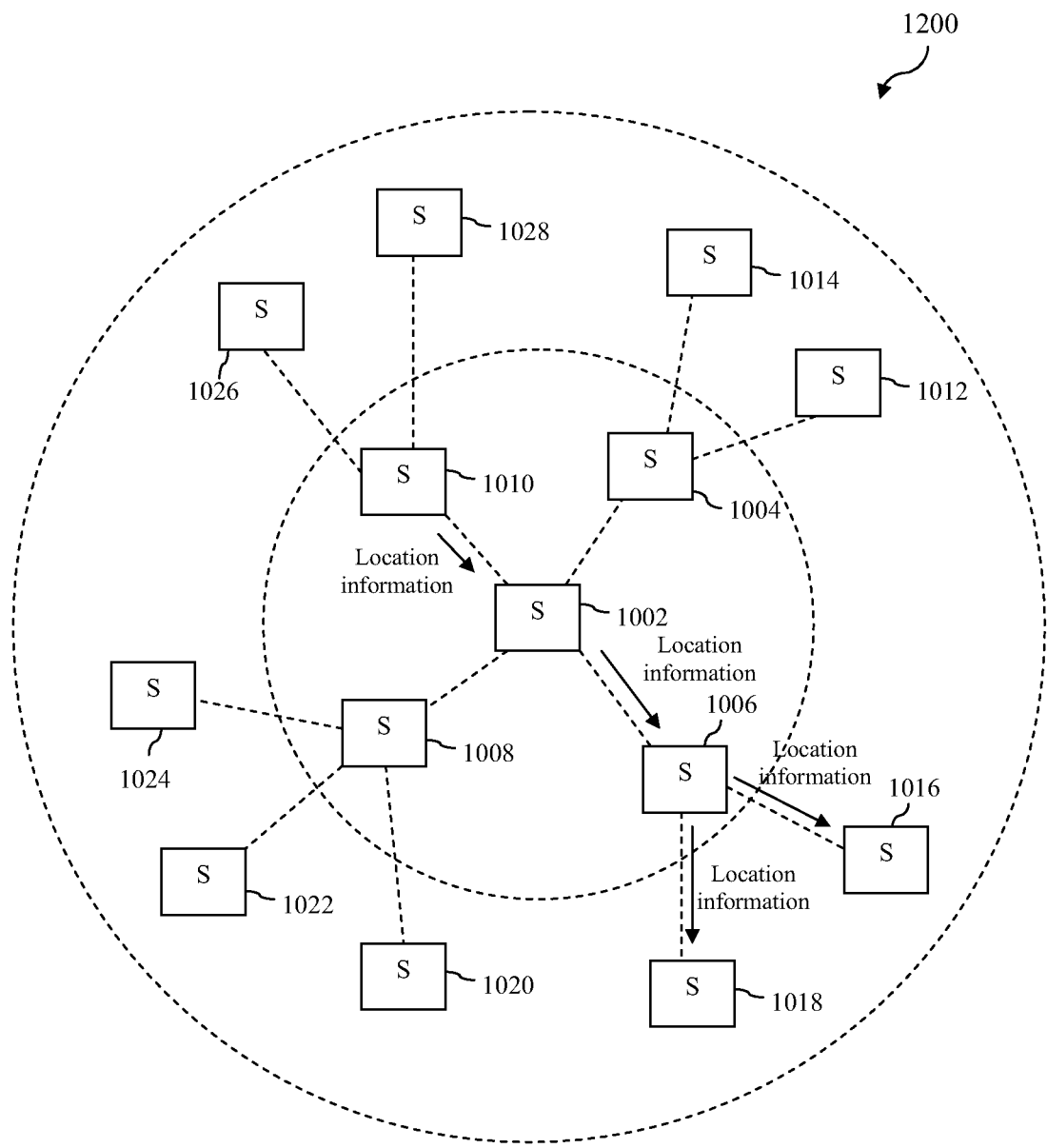
FIG. 12 is a conceptual illustration of how location information may be propagated among spatially and temporally proximate sensors in a proximity-based ad hoc network in accordance with an embodiment of the present invention.

FIG. 12 is a conceptual illustration 1200 of how location information may be propagated among spatially and temporally proximate sensors in a proximity-based ad hoc network. FIG. 12 represents the same portion of a proximity-based ad hoc network that was illustrated in FIG. 10. However, FIG. 12 also shows that location information associated with sensor 1002 may be propagated to sensor 1006 by virtue of their known spatial and temporal proximity. The propagation of this location information may encompass the generation of new location information associated with sensor 1006 or the augmentation of existing location information associated with sensor 1006. The new or augmented location information associated with sensor 1006 may then be further propagated to sensors 1016 and 1018 by virtue of their known spatial and temporal proximity. Furthermore, the location information associated with sensor 1002 may itself have been propagated from spatially and temporally proximate sensor 1010.

Where actual location information is available for a number of spatially and temporally proximate sensors in the ad hoc network, an embodiment of the present invention can advantageously select the best available location information for propagation among surrounding sensors. The determination of what constitutes the best available location information may be based, for example, on the granularity of the location information or some other indicia of the accuracy of the location information. Such other indicia may include the type of sensor that reported the location information, the conditions under which the location information was reported, the accuracy of previously-reported location information from the same sensor, or the similarity or difference between location information being reported by a particular sensor as compared to other spatially and temporally proximate sensors.

Furthermore, where actual location information is available for a number of spatially and temporally proximate sensors in the ad hoc network, an embodiment of the present invention can advantageously use the multiple instances of actual location information to detect bad sensor readings. For example, where a majority of a group of spatially and temporally proximate sensors are reporting actual location information corresponding to a first location or area and a minority of the same group is reporting actual location information corresponding to a second location or area that is geographically remote from the first area, an embodiment of the present invention can determine that the actual location information being reported by the minority is incorrect. Such an embodiment can also attempt to correct or override the bad location information with an estimated location based on the good location information being provided by surrounding sensors.

Once location tracking manager 212 has created/updated the proximity-based ad hoc network and propagated actual location information among the sensors of that network as discussed above, location tracking manager 212 then maps each of the sensors into location graph 214, which represents all the sensors currently being tracked by LBS delivery engine 102 and their current relative or actual locations.

Matching manager 216 then uses location graph 214 to enable the delivery of location based services in a manner that has been previously described.

The foregoing approach to location tracking is advantageous for a number of reasons. For example, the foregoing approach enables sophisticated location-based services to be delivered to users across multiple networks, carriers, signal types and protocols. As described above, it can be used to unify multiple sources and formats of location information into a real-time graph, or mesh, of sensors. It can also be used to deliver location-based services of multiple divergent granularities through a single proximity-based ad hoc network.

Furthermore, because the foregoing approach utilizes propagation of location information among spatially and temporally proximate sensors, it optimizes the value of available location information and enables all sensors in the ad hoc network to be positioned with great accuracy, regardless of sensor type. This approach also permits data that has heretofore been spread among different information silos to be recreated in a single database through location metadata analysis and optimization, thereby minimizing information bottlenecks and gate-keepers.

Additionally, in accordance with an embodiment of the invention, user devices may be utilized as sensors and beacons to produce a recurring optimized location-tracking model instead of as simple dumb terminals that are only relevant when engaged with a user.

Although the foregoing section describes a method for tracking the relative and actual location of sensors within the context of a proximity-based ad hoc network, it is noted that the foregoing approach can advantageously be used to track the relative and actual locations of devices and objects that are configured to or capable of acting as beacons only. So long as such beacons are detected by at least one sensor that is currently reporting sensor data to LBS delivery engine 102, those beacons can also be located within the proximity-based ad hoc network by location tracking manager 212. Consequently, location tracking manager 212 can determine the relative and actual location of beacons in a like manner to that described above for sensors, and such beacons can then also receive location-based services or other services based on this functionality.

Furthermore, although the foregoing section describes a method of location tracking that is premised, in part, on the sensing of signals transmitted or broadcast by beacons, the invention is not limited to that approach. For example, additional methods may be used to determine that users are proximally located to each other. In one embodiment, a camera acts a sensor by capturing an image of a user's face and LBS delivery engine 102 uses facial recognition technology to match the user's face to an online user identity, thereby placing the photographed user in proximity to the bearer of the camera. In another embodiment, a user manually enters personal identification information about a proximally-located user (e.g., a user name, e-mail address, telephone number, or the like) into a user device. Upon receipt of such information, LBS delivery engine 102 is then able to place the user identified by the personal identification information in proximity to the bearer of the user device.

C. Power Management for Proximity-Based Ad Hoc Networks in Accordance with an Embodiment of the Present Invention As noted above, in an embodiment of the present invention, the sensors providing sensor data to LBS delivery engine 102 may comprise sensor-enabled mobile devices or objects. These mobile sensors typically have limited access to power. For example, these mobile sensors may depend upon batteries or some other limited power supply to facilitate mobility.

Generally speaking, LBS delivery engine 102 benefits from the frequent collection and reporting of sensor data by the sensors because this allows LBS delivery engine 102 to construct or maintain a more up-to-date proximity-based ad hoc network, which in turn facilitates better location tracking. However, the collection and reporting of sensor data consumes sensor power, which as described above may be limited. If a sensor runs out of power, it will be incapable of providing sensor data to LBS delivery engine 102, which may limit the ability of LBS delivery engine 102 to perform its location tracking function. Furthermore, if a sensor is also a user device, when the sensor runs out of power, it will be incapable of performing any other functions for the user, which is undesirable from the user perspective.

Thus, it would be beneficial if the need for frequent collection and reporting of sensor data by LBS delivery engine 102 could somehow be balanced with the power requirements and constraints of each sensor in the proximity-based ad hoc network.

Figure 13:
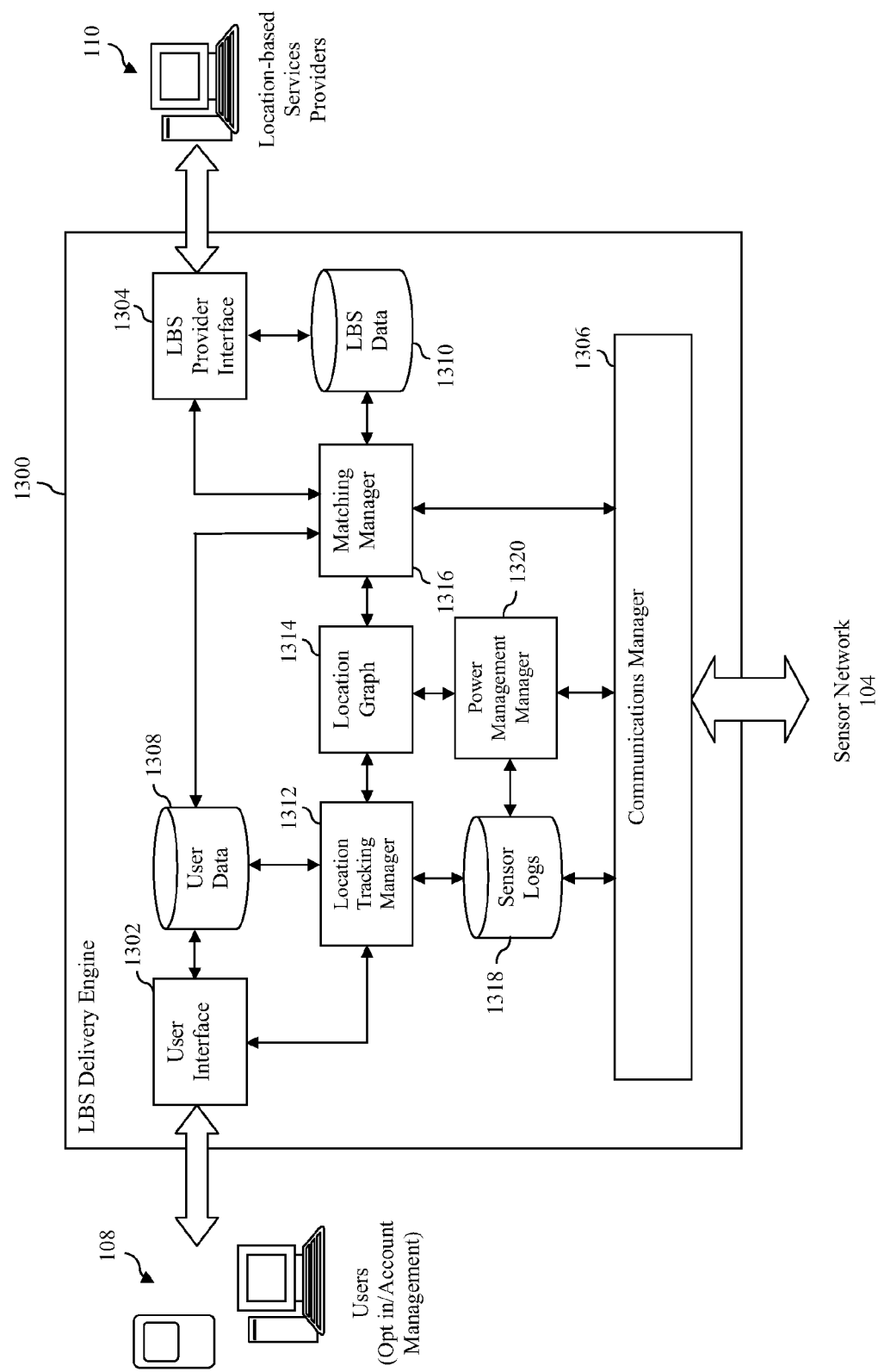
FIG. 13 is a block diagram of an LBS delivery engine in accordance with an embodiment of the present invention that includes a power management manager.

FIG. 13 is a block diagram of an LBS delivery engine 1300 that addresses the foregoing issue. In particular, and as will be described in more detail herein, LBS delivery engine 1300 leverages information concerning the power requirements and constraints of spatially and temporally proximate sensors in a proximity-based ad hoc network to make decisions concerning power consumption on a sensor, group, or network level. By continuously monitoring the position and power state of sensors in the ad hoc network, LBS delivery engine 1300 balances the need for updated sensor data with both sensor and user power requirements by dynamically and adaptively changing the manner in which each sensor collects and reports sensor data.

As shown in FIG. 13, LBS delivery engine 1300 includes a number of communicatively-connected elements including a user interface 1302, an LBS provider interface 1304, a communications manager 1306, a user data database 1308, an LBS data database 1310, a location tracking manager 1312, a location graph 1314, a matching manager 1316, and a sensor logs database 1318. With the exception of certain functions to be described immediately below, each of these elements performs essentially the same functions as described above in reference to like-named elements of LBS delivery engine 102.

As also shown in FIG. 13, LBS delivery engine further includes a power management manager 1320. Power management manager 1320 is configured to obtain power status information associated with each of a plurality of sensors currently reporting sensor data to LBS delivery engine 1300. This power status information is reported by each of the plurality of sensors via sensor network 102. In an embodiment, the power status information is transmitted by each sensor as part of or along with sensor data transmitted to LBS delivery engine 1300 and is stored by communications manager 1306 in sensor logs database 1318. The power status information for a sensor may include, but is not limited to, a measure of a current or projected amount of power available to the sensor and/or a measure of a current or projected amount of power required by the sensor.

Power management manager 1320 is further configured to obtain information concerning the spatial and temporal proximity of the sensors currently reporting sensor data to LBS delivery engine 1300 from a location graph 1314 maintained by location tracking manager 1312. Location tracking manager 1312 is configured to construct and maintain location graph 1314 in the same manner as described above in reference to location tracking manager 112 and location graph 114 of LBS delivery engine 102, and thus no further description of that process need be provided.

Power management manager 1320 is still further configured to use both the proximity and power status information associated with each of the plurality of sensors currently reporting sensor data to LBS delivery engine 1300 to make power management decisions concerning those sensors. The manner in which these power management decisions are made will be described in more detail below. Power management manager 1320 may implement the power management decisions by dynamically and adaptively controlling the manner in which one or more of the sensors collects and reports sensor data. Power management manager 1320 is configured to control these sensor functions by sending configuration commands to each of the one or more sensors over sensor network 102 via communications manager 1306.

Figure 14:
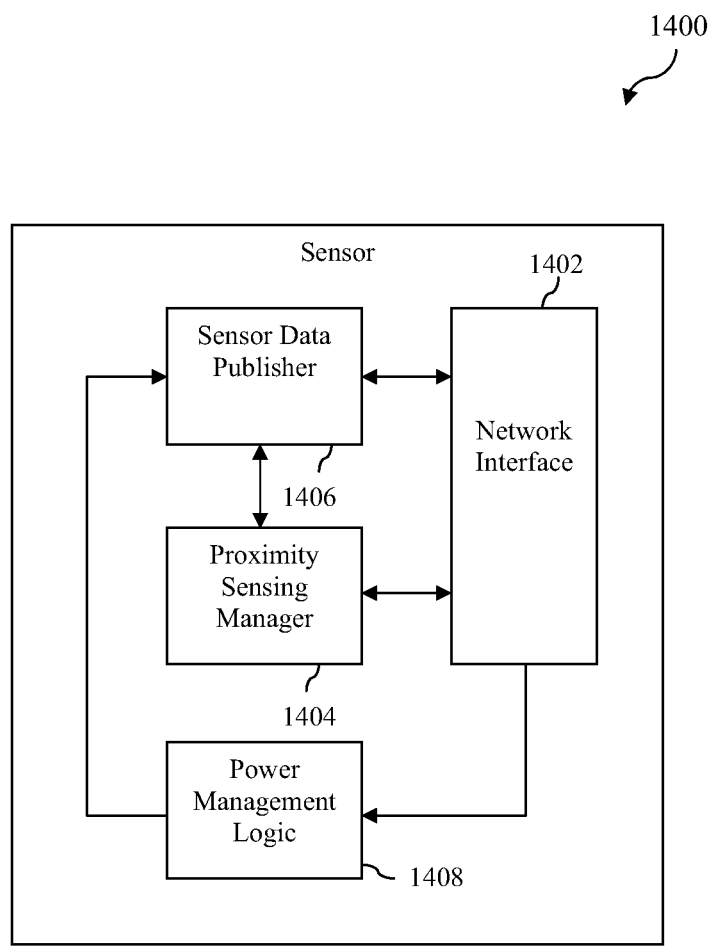
FIG. 14 is a block diagram of a sensor that includes power management logic in accordance with an embodiment of the present invention.

FIG. 14 is a block diagram of an example sensor 1400 that is configured to report power status information to LBS delivery engine 1300 and to receive configuration commands related to power management from LBS delivery engine 1300 in accordance with an embodiment of the present invention. As shown in FIG. 14, sensor 1400 includes a number of communicatively-connected components, including a network interface 1402, a proximity sensing manager 1404, and a sensor data publisher 1406. With the exception of certain functions to be described immediately below, each of these elements may perform essentially the same functions as described above in reference to like-named elements of sensor/beacon 502 or sensor/beacon 504 as depicted in FIG. 6.

As shown in FIG. 14, sensor 1400 also includes power management logic 1408. Power management logic 1408 is configured to provide power status information associated with sensor 1400 to sensor data publisher 1406 for transmission to LBS delivery engine 1406. In an embodiment, sensor data publisher 1406 includes the power status information as part of or along with other sensor data that sensor data publisher 1406 periodically transmits to LBS delivery engine 1400. In an alternate embodiment, sensor data publisher 1406 transmits the power status information separately from such sensor data. Depending upon the implementation, sensor data publisher 1406 may transmit the power status information at the same frequency or at a different frequency than the frequency with which it transmits the other sensor data. Sensor data publisher 1406 may also transmit the power status information with a time code that indicates at what time the power status information was generated.

Power management logic 1408 is also configured to modify the manner in which certain power-consuming functions are performed by sensor 1400 responsive to configuration commands received from LBS delivery engine 1300 over sensor network 104. The configuration commands are received by network interface 1402 and then passed to power management logic 1408 for processing.

As will be described in more detail herein, responsive to processing the configuration commands, power management logic 1408 may modify the manner in which sensor 1400 provides sensor data to LBS delivery engine 1300. Responsive to processing the configuration commands, power management logic 1408 may also modify a manner in which sensor 1400 acts as a beacon if sensor 1400 includes beacon functionality, or cause sensor 1400 to stop reporting positioning information if sensor 1400 includes positioning logic.

The manner in which LBS delivery engine 1300 manages power consumption among a plurality of sensors (such as sensor 1400) in a proximity-based ad hoc network will now be described with reference to flowchart 1500 of FIG. 15. Although the steps of flowchart 1500 will be described with continued reference to components of LBS delivery engine 1300 and sensor 1400, persons skilled in the relevant art(s) will readily appreciate that the method is not limited to those implementations and that other means may be used to carry out the method.

Figure 15:
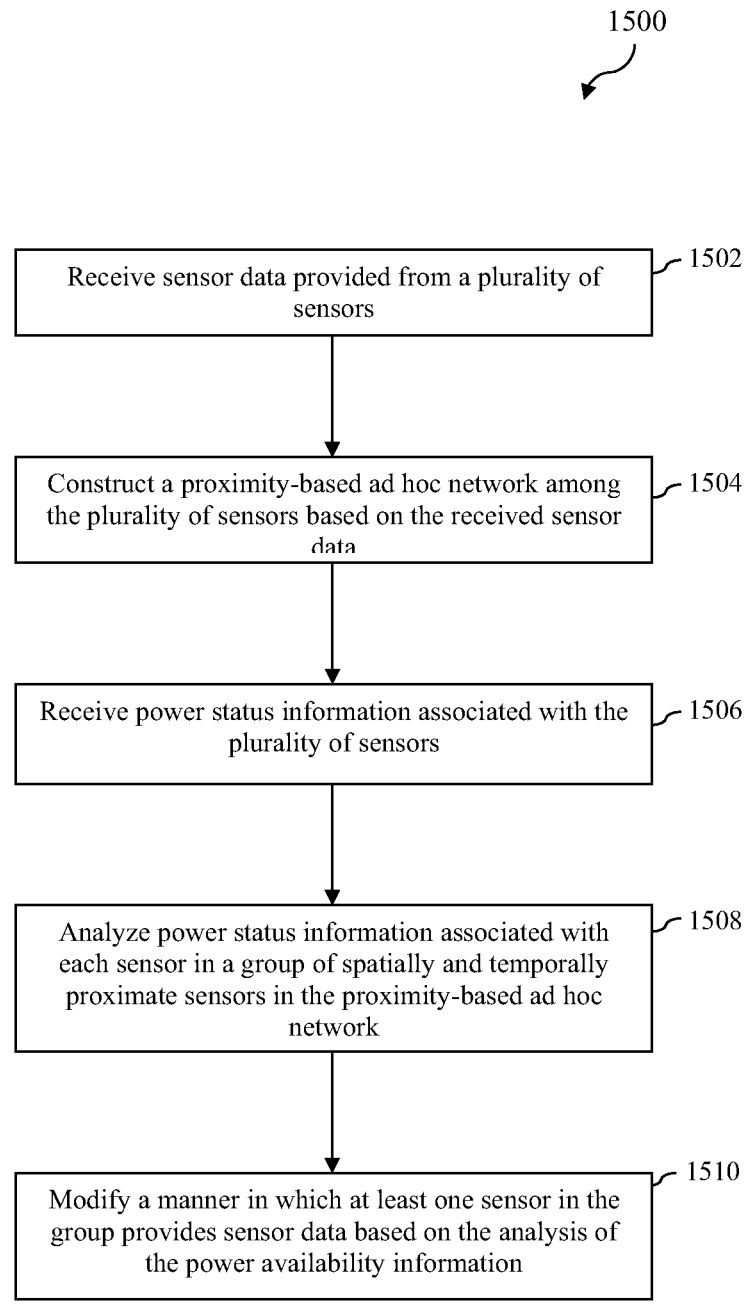
FIG. 15 is a flowchart of a method for managing power consumption in a proximity-based ad hoc network in accordance with an embodiment of the present invention.

As shown in FIG. 15, the method of flowchart 1500 begins at step 1502, in which communications manager 1306 receives sensor data provided from a plurality of sensors. Communications manager 1306 stores this sensor data in sensor logs database 1318, where it is accessible by location tracking manager 1312. At step 1504, location tracking manager 1312 constructs a proximity-based ad hoc network among the plurality of sensors based on the received sensor data. One manner in which location tracking manager 1312 may construct a proximity-based ad hoc network was described above in reference to location tracking manager 112 of LBS delivery engine 102, and thus no further description of that process need be provided.

At step 1506, communications manager 1306 also receives power status information associated with each sensor in the plurality of sensors. This power status information may be included with the sensor data received in step 1502 or may be transmitted independently of that data. The power status information for a particular sensor may also be provided at the same frequency as the sensor data received from that sensor in step 1502 or at a different frequency. For example, in one example embodiment, the power status information for a particular sensor is provided much less frequently than the sensor data associated with that sensor. This type of implementation may make sense where the power state of the sensor is not anticipated to change as quickly as the location of the sensor. The power status information may also be received with a time code indicating when the sensor generated the power status information. The power status information received by communications manager 1306 in step 1506 is stored in sensor logs database logs 1318.

At step 1508, power management manager 1320 analyzes the power status information associated with each sensor in a group of spatially and temporally proximate sensors in the proximity-based ad hoc network. This group comprises two or more sensors across which power management manager 1320 can implement a power management scheme by virtue of their spatial and temporal proximity. As described herein, the power management scheme may include assigning more power-consuming tasks relating to sensor data collection and reporting to certain sensors in a group as opposed to other sensors in the group based on the power state of each sensor in the group.

At step 1510, power management manager 1320 modifies the manner in which at least one sensor in the group of spatially and temporally proximate sensors provides sensor data based on the analysis of the power status information. Performance of this step by power management manager 1320 includes sending one or more configuration commands to a sensor via sensor network 104. Responsive to receiving a configuration command, power management logic within the sensor (such as power management logic 1408 of sensor 1400) modifies the manner in which the sensor provides sensor data.

One type of power management scheme that can be implemented by power management manager 1320 in accordance with the foregoing method involves requiring certain sensors in a group of spatially and temporally proximate sensors to perform more frequent sensor data polling and/or reporting as compared to other sensors in the same group based on the power state of each sensor. In this way, sensors with more power can be required to carry more of the polling/reporting burden as compared to other sensors in the group that have less power. This scheme is premised on the insight that in a sufficiently dense group of temporally and spatially proximate sensors, sensor data need not be collected from each sensor at the same frequency in order to construct and maintain an up-to-date proximity-based ad hoc network. Thus, this power management scheme may also take into account the current density of the group as well as the power status information associated with the sensors in the group.

Changing the sensor data polling frequency may involve sending a configuration command to a sensor, wherein the configuration command changes a parameter that is used by the sensor to determine the rate at which to scan for proximally-located beacons. Likewise, changing the rate at which a sensor reports sensor data to LBS delivery engine 1300 may comprise sending a configuration command to a sensor, wherein the configuration command changes a parameter that is used by the sensor to determine the rate at which the sensor reports sensor data. Changing the sensor data polling frequency may include temporarily turning off the polling functionality for a sensor. Likewise, changing the rate at which a sensor reports sensor data may include temporarily turning off the sensor data reporting functionality for a sensor.

Where the group of spatially and temporally proximate sensors is dense enough, power management manager 1320 may also change the manner in which at least one sensor in the group acts as a beacon. For example, power management manager 1320 may turn off beacon functionality in one or more sensors where providing such functionality is not necessary in order to obtain a reasonably up-to-date picture of the proximity-based ad hoc network.

In addition to taking into account the current density of a group of spatially and temporally proximate sensors, power management manager 1320 may also take into account the polling frequency required for a given sensor to provide useful sensor data on an ongoing basis. For example, if a sensor is stationary and the beacons in the proximity of the sensor are stationary, then the polling frequency can be reduced to an extremely low level, which conserves power. In contrast, if a sensor is moving and the beacons in the proximity of the sensor are also moving, then the polling frequency may need to be relatively high in order to capture useful sensor data. Power management manager 1320 may take such factors into account when reducing or increasing the polling frequencies associated with different sensors in the group.

Power management manager 1320 may also take into account the amount of power that must be supplied to antennas associated with sensors in the group in order for those sensors to return useful sensor data. Thus, for example, power management manager 1320 may determine that increasing the gain of an antenna associated with a first type of sensor will yield more useful data than increasing the gain of an antenna associated with a second type of sensor in the same group. In this situation, power management manager 1320 may increase the power supplied to the antenna of the first type of sensor while maintaining or reducing the power supplied to the antenna of the second type of sensor, thereby conserving power in the second type of sensor.

Power management manager 1320 may further take into account whether positioning information currently being generated by a sensor in the group is useful or accurate. For example, where other devices in the group are providing the same or more accurate positioning information, power management manager 1320 may cause the sensor to stop reporting such positioning information, thereby saving power for that sensor. One example of this is turning off the reporting of positioning data from a GPS-enabled sensor when the sensor is in an area where GPS does not work well (e.g., when the sensor is indoors).

In accordance with another power management scheme, power management manager 1320 may cause a selected sensor in the group to collect sensor data from one or more other sensors in the group over a local network connection and to provide the collected sensor data to LBS delivery engine 1300 on behalf of the other sensor(s). Power management manager 1320 may also cause the selected sensor to receive data related to location based services from LBS delivery engine 1300 on behalf of the other sensor(s) and to disseminate this data to the other sensor(s). This allows the selected sensor, which may have more available power, to act as a communication hub for other sensors that have less available power.

Figure 16:
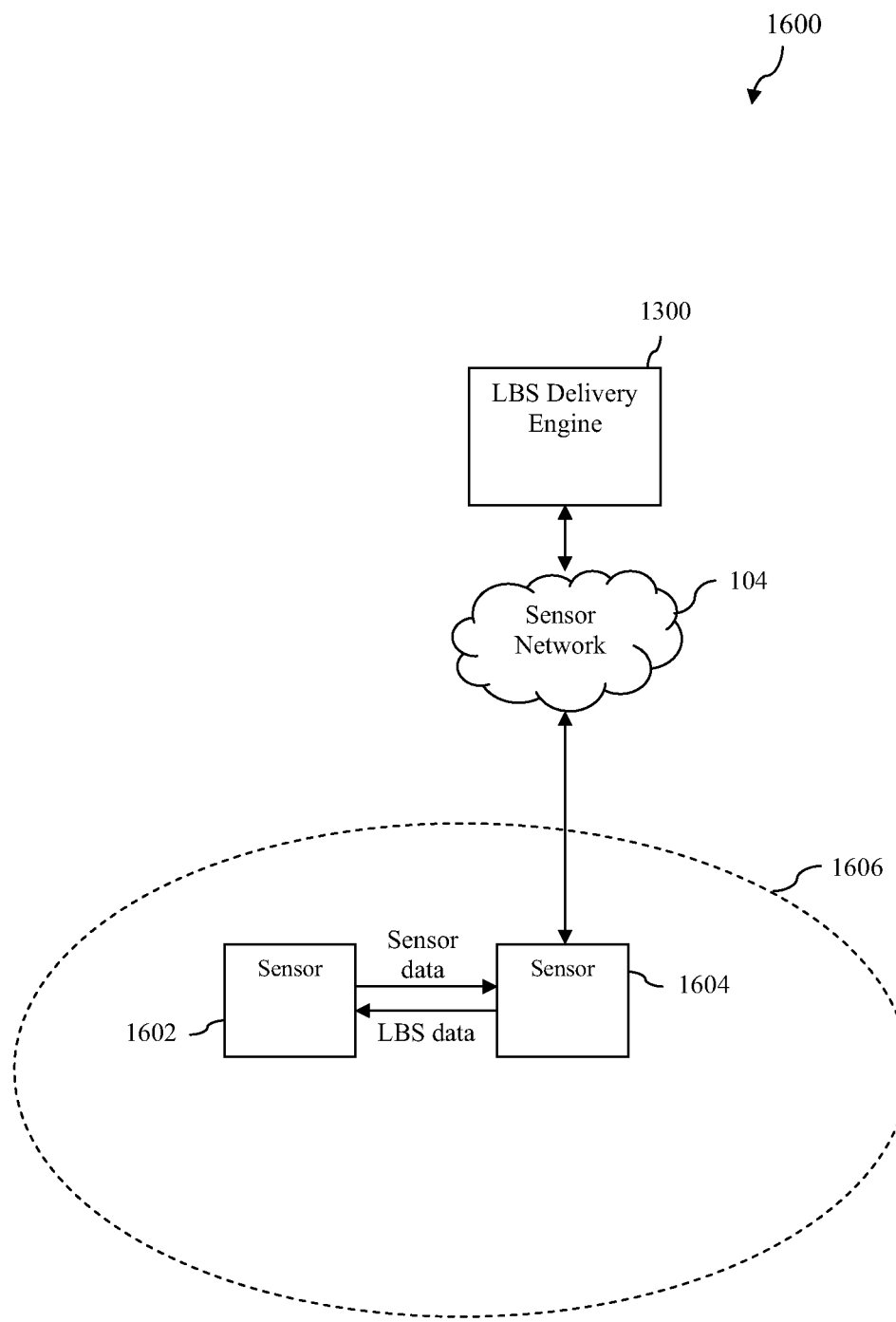
FIG. 16 is a block diagram of a power management scheme in which a first sensor uses a second sensor as a communication hub in a proximity-based ad hoc network.

An example of this power management scheme is illustrated in block diagram 1600 of FIG. 16, which shows a first sensor 1602 and a second sensor 1604 in a group 1606 of spatially and temporally proximate sensors.

As shown in FIG. 16, second sensor 1604 receives sensor data from first sensor 1602 over a local network connection and provides the sensor data on behalf of the first sensor 1602 to LBS delivery engine 1600 over sensor network 104. As also shown in FIG. 16, second sensor 1604 receives location based services data from LBS delivery engine 1300 over sensor network 104 on behalf of first sensor 1602 and disseminates the location based services data to first sensor 1602.

Power management manager 1320 may automatically identify groups of spatially and temporally proximate sensors over which power management is to be performed. Such groups may be identified based on spatial and temporal proximity, power resources, or other factors. The size of such groups may vary depending upon the implementation or mode of operation. At one extreme, the group may encompass all of the sensors in the proximity-based ad hoc network constructed by location tracking manager 1312. At the other extreme, the group may consist of only two sensors. Still further, power management manager 1320 may perform power management for individual sensors. For example, power management manager 1320 may apply any of the aforementioned methods for reducing power consumption in a sensor (such as a sensor that is reporting a low power condition) without regard to the power state of any spatially and temporally proximate sensors.

An embodiment of the present invention also advantageously allows a user to override or control the manner in which power management manager 1320 performs the power management function. For example, in one embodiment, the user is allowed to reduce the frequency with which sensor data is collected and/or reported by a sensor, or to turn off the polling or reporting functionality entirely. This permits a user to conserve sensor power that can then be dedicated to other functions if desired. Turning off these functions may also be desirable for reasons relating to protecting user privacy or conserving costs associated with communicating with LBS delivery engine 1300. Such user control mechanisms may be contained within the sensor itself or implemented through user communication with LBS delivery system 1300.

In an alternative embodiment, the user is allowed to fix the frequency with which sensor data is collected and/or reported by a sensor regardless of the power management functionality. This might be used, for example, by a parent to ensure that a sensor associated with a child continues to provide sensor data even when the sensor is in a low power state, thereby allowing the location of the child to be continuously tracked by LBS delivery system 1300.

In accordance with another embodiment, users may define groups of sensors over which power management manager 1320 should perform power management functions. For example, a user may specify a group of sensors associated with the members of a family, the members of a business organization, or participants in an activity or event over which power management should be performed. This advantageously allows for power sharing and load balancing among the sensors used by a particular group of people. In a further embodiment, a user may define a hierarchy associated with the sensors in the user-defined group, wherein the power of the sensors at the bottom of the hierarchy is to be consumed prior to or at a greater rate than the power of the sensors at the top of the hierarchy. This may involve, for example, increasing the rate at which sensor data is collected or reported by one or more sensors at the bottom of the hierarchy or causing one or more sensors at the bottom of the hierarchy to act as a communication hub with LBS delivery engine 1300.

As discussed above, power management manager 1320 analyzes power status information associated with each sensor in a group of spatially and temporally proximate sensors and then implements a power management scheme based on the analysis. In one embodiment, power management manager 1320 uses the power status information to predict the future power usage of each of the sensors, the data transmission methods associated therewith, and the combination of all of these working in parallel in order to achieve a balance between maximum operation time and accurate location/proximity sensing and reporting.

In a further embodiment, power management manager 1320 takes into account an estimate of when a user will next recharge a sensor in determining a power management scheme for that sensor or for a group of sensors. This estimate may be based, for example, on historical information relating to when the user recharged the sensor in the past or on the current proximity of the sensor to a recharging source.

To implement the foregoing approach to power management, an embodiment of the present invention may need to manage the CPU priority of the sensing software operating on a sensor. This may involve dynamically changing the standby mode settings for the sensor so that the sensor does not automatically enter into a power-down or standby state after a certain period of inactivity, thereby disabling the collection and reporting of sensor data.

In one embodiment of the present invention, power management manager 1320 may change the priority or rate of collection of sensor data by a sensor based in part on a prediction of change. For example, the polling frequency of a sensor may be increased when new sensors or beacons are encountered and decreased if the surrounding sensors or beacons are more static.

In a further embodiment of the present invention, a sensor may include an encounters management system that organizes collected sensor data based on encounters with other sensors or beacons. The encounters management system may manage or track certain information associated with each encounter such as a start time, end time, location, target device and source device. The encounters management system may include a store and forward mechanism to optimize outgoing sensor data and to manage the frequency with which such data is reported. Optimization of the reporting frequency may be performed on a per encounter basis. Prioritization may be performed based on device type, whether the encounter is a first encounter, updating an end time of the encounter (less urgent/frequent), contact type (e.g., friend or stranger), or the like.

D. Time Code Validation and Correction for Proximity-Based Ad Hoc Networks

As discussed above, in one embodiment of the present invention, the sensor data provided from each sensor to the LBS delivery engine includes at least a unique ID associated with the sensor, one or more unique IDs respectively associated with each of the beacons currently detected by the sensor, and one or more time codes indicating when each beacon was respectively sensed by the sensor. The LBS delivery engine uses the time codes included in this sensor data to determine which sensors are detecting which beacons at a given moment in time or during a given window of time. This ability of the LBS delivery engine to correlate sensor data based on time codes is critical in building and maintaining a proximity-based ad-hoc network that is useful for location tracking.

A problem arises however, when a sensor generates time codes using a notion of time that is different than the notion of time held by other sensors reporting sensor data to the LBS delivery engine. When this occurs, the ability of the LBS delivery engine to correctly correlate sensor data received from all the sensors based on time codes is impaired. This may occur, for example, when a sensor in a network uses a local clock to generate time codes while other sensors in the same network use a network clock to generate time codes, and the local clock and the network clock are not synchronized. This may also occur, for example, when a sensor in a first network uses a first network clock to generate time codes while a sensor in a second network users a second network clock to generate time codes, wherein the first network clock and the second network clock are not synchronized.

Figure 17:
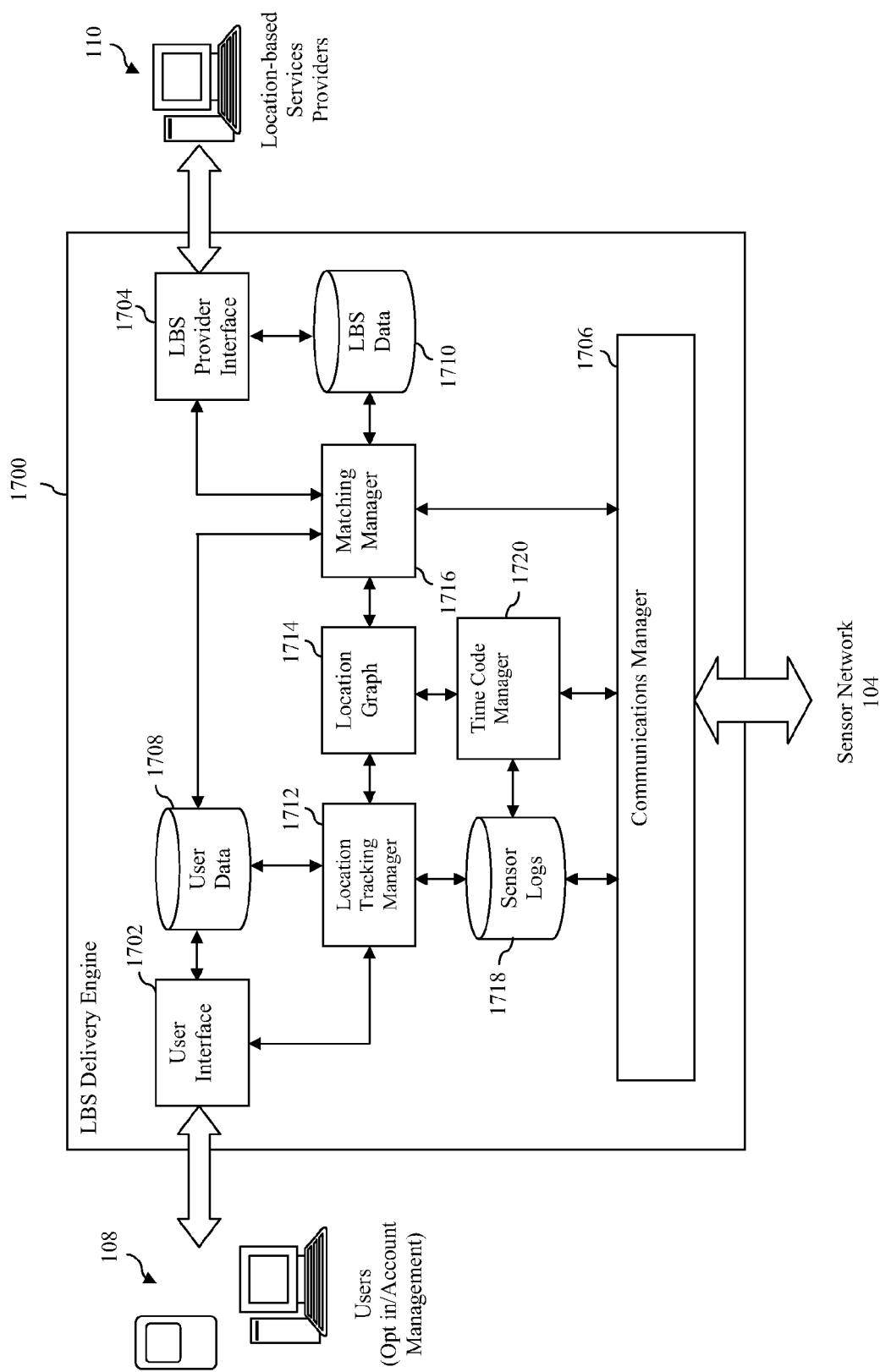
FIG. 17 is a block diagram of an LBS delivery engine in accordance with an embodiment of the present invention that includes a time code manager.

FIG. 17 is a block diagram of an LBS delivery engine 1700 that addresses the foregoing issue. In particular, and as will be described in more detail herein, LBS delivery engine 1700 leverages information concerning the temporal and spatial proximity of sensors in a proximity-based ad hoc network to validate and/or correct time codes generated by those sensors. In one embodiment, LBS delivery engine 1700 applies collaborative filtering to time codes generated by co-located sensors in the ad hoc network to validate and/or correct the time codes generated by those sensors. In another embodiment, LBS delivery engine 1700 uses geographic location information associated with or propagated among certain proximally-located sensors in the ad hoc network to obtain a local time that can then be used to correct and validate time codes generated by co-located sensors. In either embodiment, LBS delivery engine 1700 may address the detection of an incorrect time code by implementing a time code offset for a particular sensor, by causing a state of a clock associated with the sensor to be automatically modified, or by notifying a user of the sensor that the a state of a clock associated with the sensor should be manually modified.

As shown in FIG. 17, LBS delivery engine 1700 includes a number of communicatively-connected elements including a user interface 1702, an LBS provider interface 1704, a communications manager 1706, a user data database 1708, an LBS data database 1710, a location tracking manager 1712, a location graph 1714, a matching manager 1716, and a sensor logs database 1718. With the exception of certain functions to be described immediately below, each of these elements performs essentially the same functions as described above in reference to like-named elements of LBS delivery engine 102.

As also shown in FIG. 17, LBS delivery engine 1700 further includes a time code manager 1720. Time code manager 1720 is configured to obtain time codes generated by each of a plurality of sensors currently reporting sensor data to LBS delivery engine 1700. As discussed above, these time codes comprise part of sensor data that is periodically transmitted by each of the plurality of sensors to LBS delivery engine 1700 via sensor network 104 and that is stored by communications manager 1706 in sensor logs database 1718. Depending upon the implementation, time code manager 1720 may obtain time codes by extracting them from sensor logs database 1718 or from location graph 1714 in an embodiment in which time codes are maintained in association with sensors mapped to location graph 1714 by location tracking manager 1712.

Time code manager 1720 is further configured to obtain information concerning the spatial and temporal proximity of the sensors currently reporting sensor data to LBS delivery engine 1700 from location graph 1714 maintained by location tracking manager 1712. Location tracking manager 1712 is configured to construct and maintain location graph 1714 in the same manner as described above in reference to location tracking manager 112 and location graph 114 of LBS delivery engine 102.

Time code manager 1720 is still further configured to use both the proximity information and time codes associated with each of the plurality of sensors currently reporting sensor data to LBS delivery engine 1700 to automatically validate and/or correct the time codes generated by those sensors. The manner in which these functions are performed by time code manager 1720 will now described with reference to flowcharts depicted in FIGS. 18 and 20.

Figure 18:
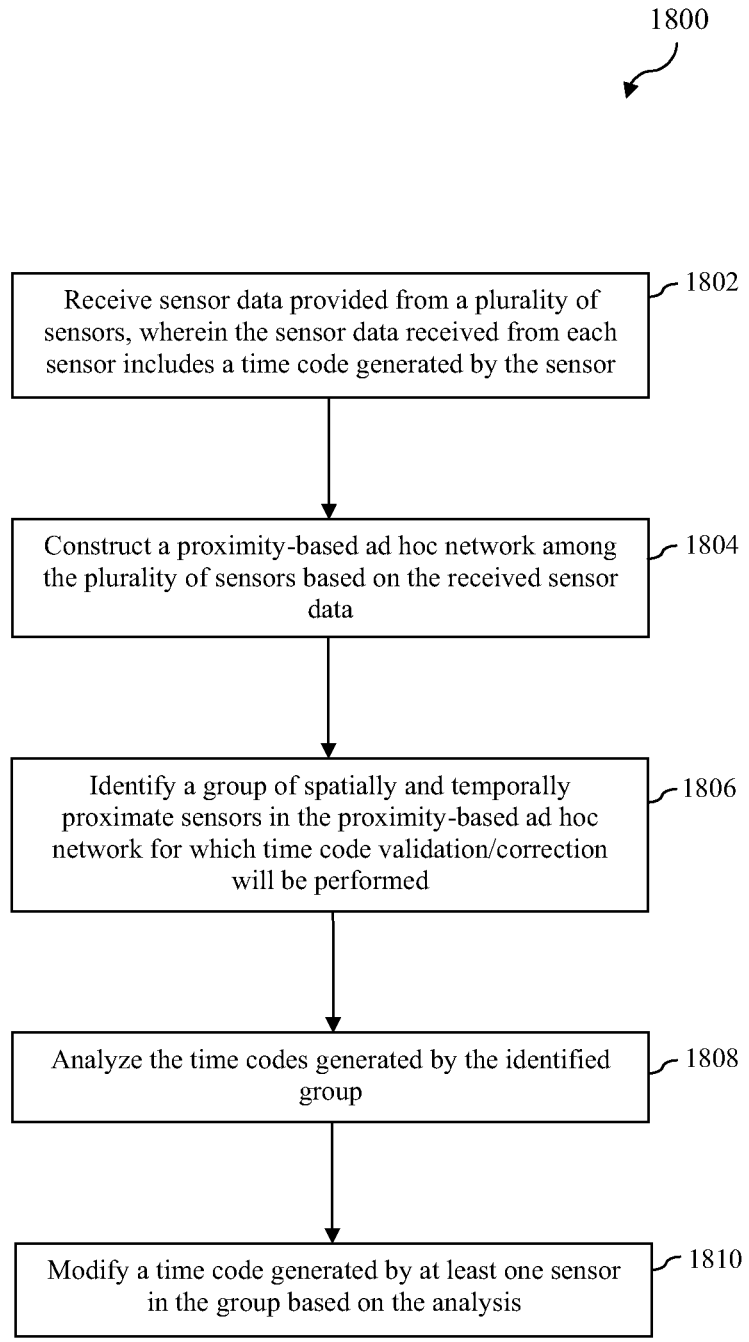
FIG. 18 depicts a flowchart of a first method for validating and correcting time codes generated by a plurality of sensors in accordance with an embodiment of the present invention.

In particular, FIG. 18 depicts a flowchart 1800 of a first method by which LBS delivery engine 1700 validates and corrects time codes generated by a plurality of sensors in accordance with an embodiment of the present invention. Although the steps of flowchart 1800 will be described with continued reference to components of LBS delivery engine 1700, persons skilled in the relevant art(s) will readily appreciate that the method is not limited to those implementations and that other means may be used to carry out the method.

As shown in FIG. 18, the method of flowchart 1800 begins at step 1802, in which communications manager 1706 receives sensor data provided from a plurality of sensors, wherein the sensor data received from each sensor includes a time code generated by the sensor. Communications manager 1706 stores this sensor data in sensor logs database 1718, where it is accessible by location tracking manager 1712. At step 1804, location tracking manager 1712 constructs a proximity-based ad hoc network among the plurality of sensors based on the received sensor data. One manner in which location tracking manager 1712 may construct a proximity-based ad hoc network based on the received sensor data was described above in reference to location tracking manager 112 of LBS delivery engine 102, and thus no further description of that process need be provided.

At step 1806, time code manager 1720 identifies a group of two or more spatially and temporally proximate sensors in the proximity-based ad hoc network for which time code validation and/or correction will be performed. The manner in which time code manager 1720 identifies the group of sensors may vary depending upon the implementation and mode of operation of time code manager 1720. For example, time code manager 1720 may identify a group based on a physical or logical partitioning of the sensors in the ad hoc network, wherein such partitioning may be based on, for example, a predefined group size or group density or on the relative or actual location of sensors within the ad hoc network. Time code manager 1720 may also identify a group based on a perceived discrepancy between time codes generated by sensors in the group or by a measure of the degree of such discrepancy.

Figure 19:
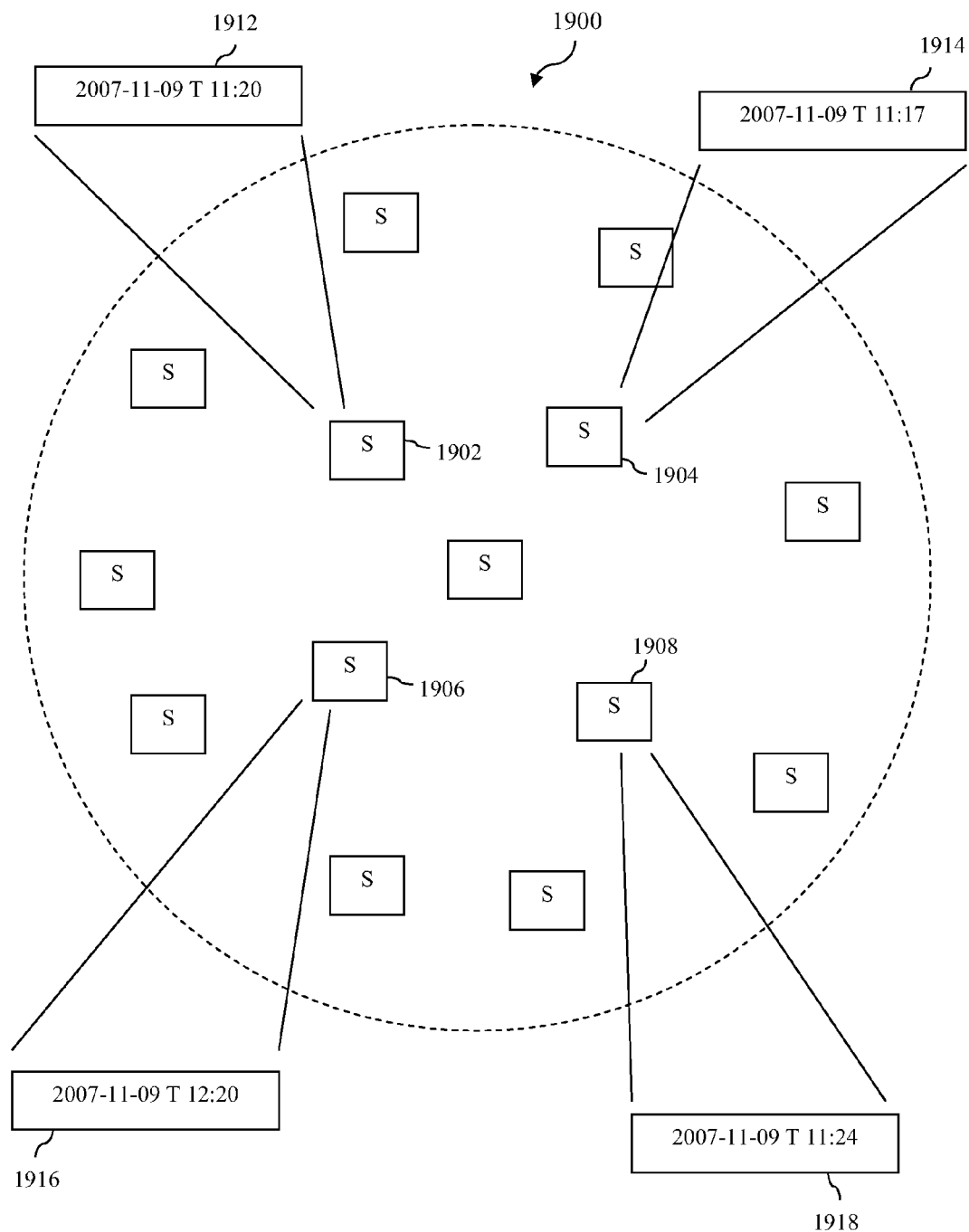
FIG. 19 is a block diagram of a group of spatially and temporally proximate sensors in a proximity-based ad hoc network for which time code validation and/or correction may be performed in accordance with an embodiment of the present invention.

FIG. 19 is a block diagram that illustrates an exemplary group 1900 of spatially and temporally proximate sensors that may be identified by time code manager 1720 in accordance with step 1806 of flowchart 1800. As shown in FIG. 19, group 1900 includes four sensors (sensors 1902, 1904, 1906 and 1908 respectively) each of which has been determined to be spatially proximate to the other at a particular time or during a particular time period by location tracking manager 1712 and each of which generated sensor data that included a different time code at that time or during that time period. In particular, as shown in FIG. 19, sensor 1902 generated a first time code 1912, sensor 1904 generated a second time code 1914, sensor 1906 generated a third time code 1916 and sensor 1908 generated a fourth time code 1918. For the purposes of this example, it is to be assumed that the time codes generated by each of sensors 1902, 1904, 1906 and 1908 should have been identical or within the same range of values because each of these sensors obtained polling data associated with these time codes at approximately the same time or during the same time period. It is to be further assumed that the time codes are not identical or not within the same range of values because the clocks used by each of the sensors to generate the time codes are not synchronized.

Despite the discrepancies between these time codes, location tracking manager 1712 is capable of determining that sensors 1902, 1904, 1906 and 1908 are co-located by virtue of the sensor data reported by those sensors and the sensors surrounding them. For example, location tracking manager 1712 may determine that sensors 1902, 1904, 1906 and 1908 are co-located at a particular time or during a particular time period because other spatially-proximate sensors in group 1900 reported detecting those sensors at the same time or during the same time period. As another example, location tracking manager 1712 may determine that sensors 1902, 1904, 1906 and 1908 are co-located at a particular time or during a particular time period because each of these sensors reported detecting the same stationary beacon within a particular time interval. However, these examples are not intended to be limiting and other methods of identifying co-located sensors reporting different time codes may also be used.

Although location tracking manager 1712 is capable of determining that sensors 1902, 1904, 1906 and 1908 are co-located even when such sensors are reporting different time codes, it would be advantageous to validate and, when appropriate, correct the time codes generated by these sensors. By performing this function, time code manager 1720 can improve the integrity of sensor data subsequently received from these sensors, which in turn improves the ability of location tracking manager 1712 to correlate sensor data based on time codes and to identify with greater ease and precision the time periods during which sensors are co-located. Furthermore, by performing this function, time code manager 1720 enables clocks associated with the sensors to be automatically or manually reset to correct future time code generation when appropriate.

Returning now to the method of flowchart 1800, after time code manager 1720 has identified a group of spatially and temporally proximate sensors for which time code validation and/or correction will be performed, time code manager 1720 analyzes the time codes generated by the identified group as shown at step 1808. In one embodiment, this step comprises assigning a confidence value to each of the time codes generated by the group. The confidence value assigned to a time code is essentially a measure of the likelihood that the time code is the most accurate among all the time codes being analyzed. Accuracy may be measured relative to a notion of time maintained by other sensors in the proximity-based ad hoc network or to a notion of time maintained by LBS delivery engine 1700.

Time code manager 1720 may take into account a variety of factors in assigning a confidence value to a particular time code. For example, time code manager 1720 may assign a confidence value to a time code based at least in part on the number of sensors in the group that generated that time code, wherein the more sensors that generated the time code, the higher the confidence value. Time code manager 1720 may construct a histogram of the time codes generated by the group in order to perform this function.

Time code manager 1720 may assign a confidence value to a time code based at least in part on an indicator of the reliability of a sensor or sensors that generated that time code. Thus, for example, time code manager 1720 may assign a lower confidence value to a time code when that time code was generated by a sensor operating under adverse sensing conditions (e.g., a sensor detecting beacons over a channel experiencing interference, or a sensor moving at a high velocity) or when that time code was generated by a sensor that has historically generated inaccurate time codes or poor sensor data.

At step 1810, time code manager 1720 modifies a time code generated by at least one sensor in the group based on the analysis performed in step 1808. This step may include, for example, selecting one of the time codes generated by the group based on confidence values assigned to the time codes and/or on some other factor(s) and then replacing a time code generated by at least one sensor in the group by the selected time code. In another embodiment, this step may comprise combining or averaging one or more time codes generated by the group based on the confidence values assigned to the time codes and/or on some other factor(s) to generate a combined time code and then replacing a time code generated by at least one sensor in the group by the combined time code. This step may also comprise adding or subtracting a time offset to a time code generated by at least one sensor in the group.

The foregoing method advantageously applies collaborative filtering to time codes generated by co-located sensors to validate and/or correct the time codes generated by those sensors. In further accordance with this embodiment, once time code manager 1720 has identified a sensor that has generated an inaccurate time code, it can take steps to ensure that future time codes provided by the same sensor are more accurate. For example, time code manager 1720 can apply a predetermined offset to subsequently-received time codes generating by the same sensor to ensure that such time codes are more accurate. Alternatively, time code manager 1720 can send a command to the sensor, wherein the command causes the state of a clock used by the sensor to generate time codes to be modified automatically. Still further, time code manager 1720 can send a notification to a user of the sensor indicating that a state of a clock associated with the sensor should be modified, so that the user can modify the clock manually.

Figure 20:
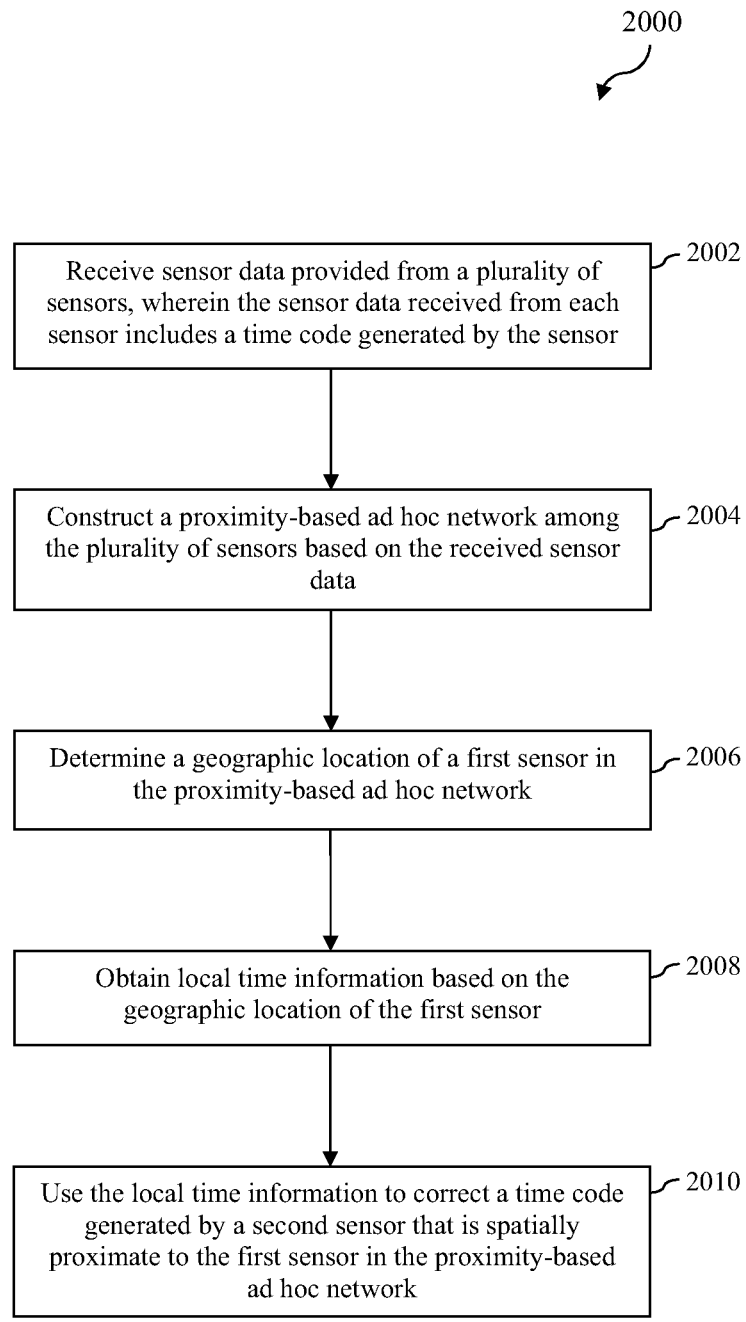
FIG. 20 depicts a flowchart of a second method for validating and correcting time codes generated by a plurality of sensors in accordance with an embodiment of the present invention.

FIG. 20 depicts a flowchart 2000 of a second method for validating and correcting time codes generated by a plurality of sensors in accordance with an embodiment of the present invention. The method of flowchart 2000 may be used as an alternative to or in conjunction with the method of flowchart 1800 to improve the integrity of such time codes. Like flowchart 1800, the steps of flowchart 2000 will be described with continued reference to components of LBS delivery engine 1700, persons skilled in the relevant art(s) will readily appreciate that the method is not limited to those implementations and that other means may be used to carry out the method.

As shown in FIG. 20, the method of flowchart 2000 begins at step 2002, in which communications manager 1706 receives sensor data provided from a plurality of sensors, wherein the sensor data received from each sensor includes a time code generated by the sensor. Communications manager 1706 stores this sensor data in sensor logs database 1718, where it is accessible by location tracking manager 1712. At step 2004, location tracking manager 1712 constructs a proximity-based ad hoc network among the plurality of sensors based on the received sensor data. One manner in which location tracking manager 1712 may construct a proximity-based ad hoc network based on the received sensor data was described above in reference to location tracking manager 112 of LBS delivery engine 102, and thus no further description of that process need be provided.

At step 2006, location tracking manager 1712 determines a geographic location of a first sensor in the proximity-based ad hoc network. Location tracking manager 1712 may determine the geographic location of the first sensor by analyzing location information that is provided by the first sensor to LBS delivery engine 1700 along with other sensor data. Such location information may include, for example, location information provided by a GPS module or other positioning module within the first sensor or location information (e.g., a zip code, street address, or the like) provided by a user of the first sensor. Alternatively, location tracking manager 1712 may determine the geographic location of the first sensor by propagating location information from a spatially and temporally proximate sensor to the first sensor in a like manner to that described above in reference to flowchart 1100 of FIG. 11.

At step 2008, time code manager 1720 obtains local time information based on the geographic location of the first sensor. For example, time code manager 1720 may use the geographic location of the first sensor to determine the time zone in which the first sensor is currently located and to determine a local time associated with the time zone.

At step 2010, time code manager 1720 uses the local time information to correct a time code generated by a second sensor that is spatially proximate to the first sensor in the proximity-based ad hoc network. For example, time code manager 1720 may compare the time code generated by the second sensor to the local time determined in step 2008 and correct the time code responsive to detecting a discrepancy.

The foregoing method advantageously uses geographic location information associated with or propagated among certain sensors in the ad hoc network to obtain a local time that can then be used to validate and correct time codes generated by co-located sensors. In further accordance with this embodiment, once time code manager 1720 has identified a sensor that has generated an inaccurate time code, it can take steps to ensure that future time codes provided by the same sensor are more accurate. For example, time code manager 1720 can apply a predetermined offset to subsequently-received time codes generating by the same sensor to ensure that such time codes are more accurate. Alternatively, time code manager 1720 can send a command to the sensor, wherein the command causes the state of a clock used by the sensor to generate time codes to be modified automatically. Still further, time code manager 1720 can send a notification to a user of the sensor indicating that a state of a clock associated with the sensor should be modified, so that the user can modify the clock manually.

E. Data Sharing Based on Proximity-Based Ad Hoc Network

It would be advantageous if users of portable electronic devices could easily transfer data between such devices. However, conventional protocols for establishing a communication link between compatible devices can be time consuming. For example, in order to pair two Bluetooth™ devices together, at least one of the two devices must be placed in a mode in which it can discover the other device. Once the other device has been discovered, the same passkey must be entered into each of the two devices. Only after this process is complete can data be shared between the two devices. This is a cumbersome process. Furthermore, where user devices are not compatible (e.g., where one device supports only Bluetooth™ communication and the other supports only WiFi communication), direct data transfer between the devices is simply not possible.

It would also be beneficial if information could be automatically transferred between user devices responsive to co-location of those devices. Such a system could advantageously be used, for example, to exchange information or notifications among users who are personally and/or professionally related (or users who are likely to form such a relationship) at a point in time when such users are proximally located. Such a system could also advantageously be used to distribute marketing information or other commercial information to and among proximally-located users. These are only a few examples of the benefits of such a system. However, such automatic data transfer should be carried out in a manner that protects user privacy.

Figure 21:
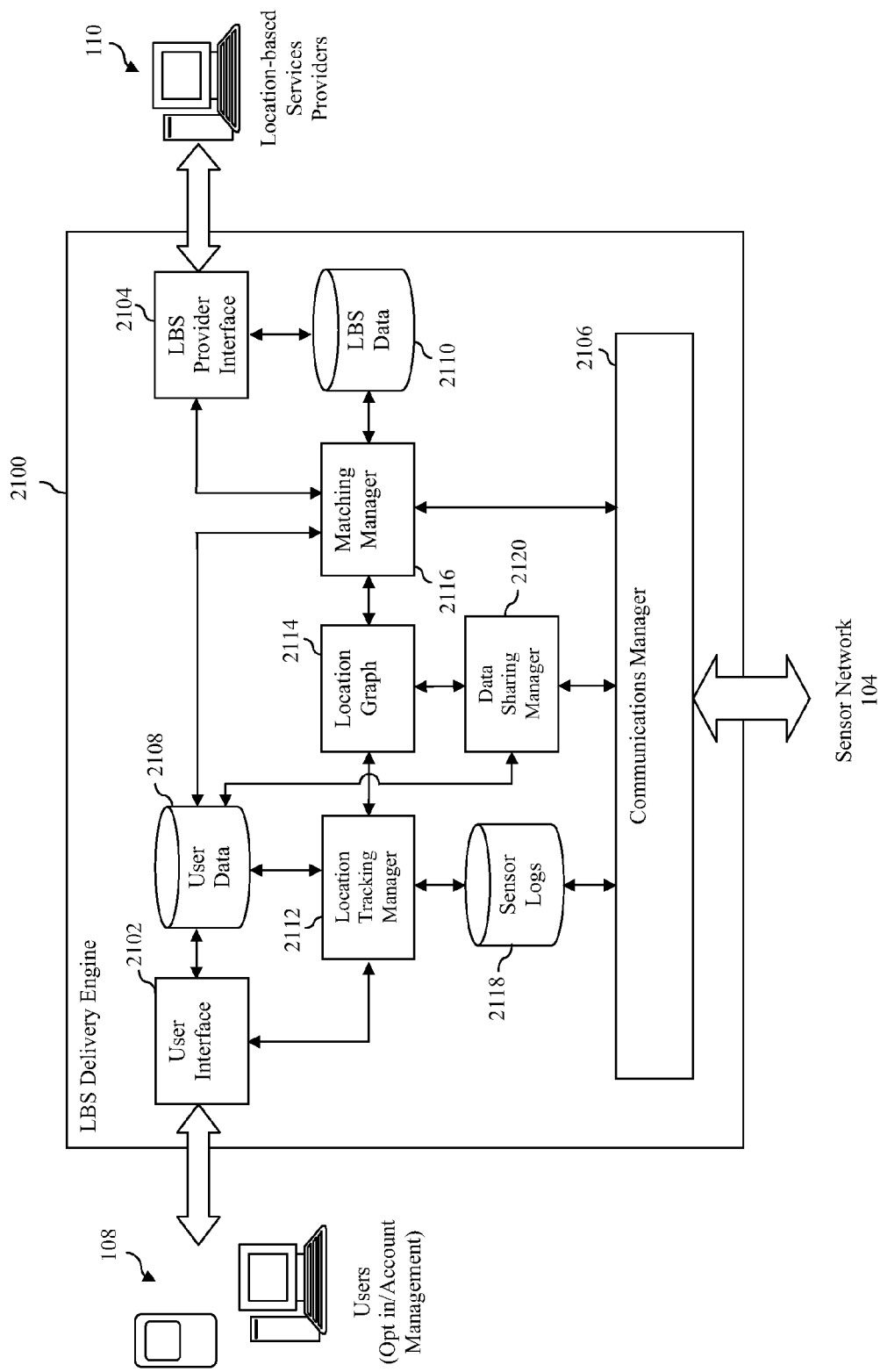
FIG. 21 is a block diagram of an LBS delivery engine in accordance with an embodiment of the present invention that includes a data sharing manager.

FIG. 21 is a block diagram of an LBS delivery engine 2100 that addresses the foregoing issues. In particular, and as will be described in more detail herein, LBS delivery engine 2100 advantageously enables data to be shared among co-located sensors in a manner that does not require local connections or communication among those sensors and that protects user privacy. LBS delivery engine 2100 also beneficially enables data to be transferred among heterogeneous sensor types that would otherwise be incapable of detecting and/or communicating with each other. LBS delivery engine 2100 may perform user-initiated data transfer as well as automatic data transfer responsive to sensor proximity and other factors, such as commonality of user interests and/or activities or membership in a social network.

As shown in FIG. 21, LBS delivery engine 2100 includes a number of communicatively-connected elements including a user interface 2102, an LBS provider interface 2104, a communications manager 2106, a user data database 2108, an LBS data database 2110, a location tracking manager 2112, a location graph 2114, a matching manager 2116, and a sensor logs database 2118. With the exception of certain functions to be described immediately below, each of these elements performs essentially the same functions as described above in reference to like-named elements of LBS delivery engine 102.

Figure 22:
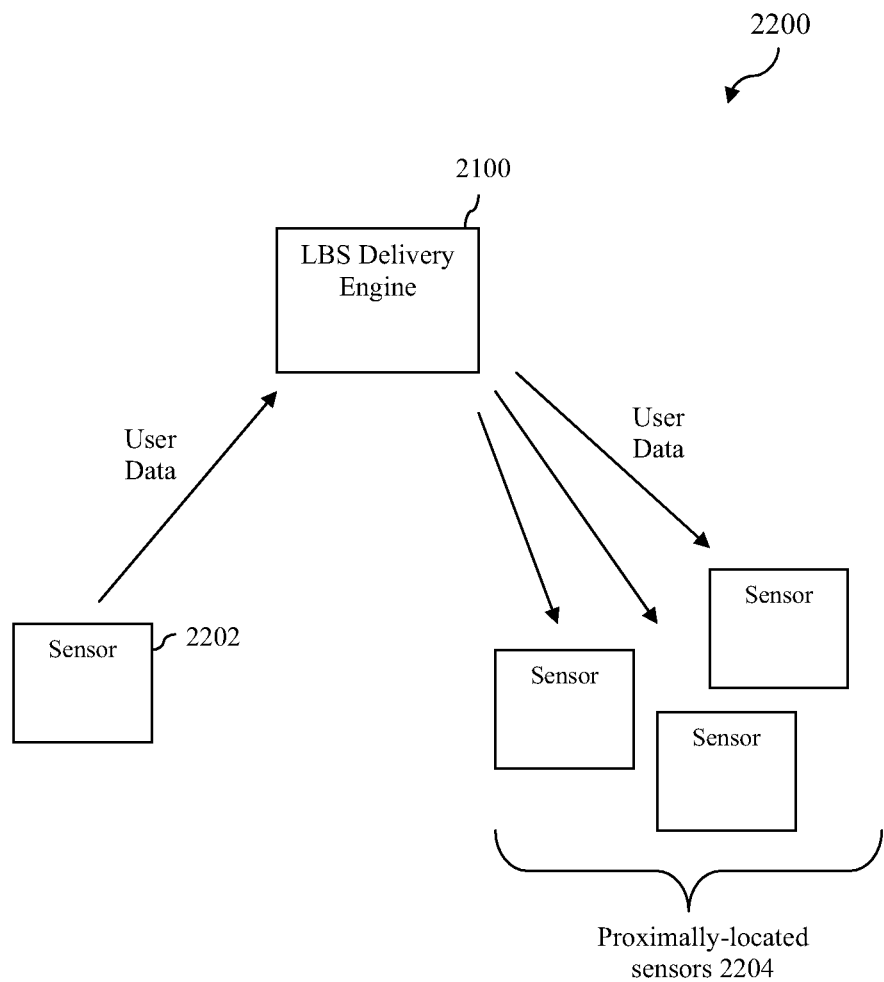
FIG. 22 is a block diagram of a system in which an LBS delivery engine transfers user data from a first sensor to a plurality of proximally-located sensors in accordance with an embodiment of the present invention.

As also shown in FIG. 21, LBS delivery engine 2100 further includes a data sharing manager 2120. Data sharing manager 2120 is configured to facilitate the transfer of user data between and among proximally-located sensors by receiving user data from a first sensor and then transferring such user data to one or more other sensors when such other sensor(s) is/are temporally and spatially proximate to the first sensor. Thus, data sharing manager 2120 allows LBS delivery engine 2100 to act as an intermediary between the first sensor and the other sensor(s) for the purposes of such data transfer. This is illustrated in FIG. 22, which shows a system 2200 in which a first sensor 2202 transfers user data to LBS delivery engine 2100 and in which LBS delivery engine 2100 transfers copies of the user data to each of a plurality of proximally-located sensors 2204.

To perform this function, data sharing manager 2120 is configured to determine which sensors are proximally-located by accessing the current graph 2114 of sensor locations, which is maintained by location tracking manager 2112 in a manner described in detail above. Data sharing manager 2120 is also configured to determine whether other conditions beyond sensor proximity have been satisfied prior to performing a data transfer. These conditions may include user-specified conditions or preferences relating to privacy, to eligible data transfer sources or targets, or to other aspects of data transfer that are stored in user data database 2108. These user-specified conditions or preferences may be provided or set by a user via user interface 2102.

Depending upon the implementation, user data eligible for transfer is provided to data sharing manager 2120 from a user device via sensor network 104 and/or via user interface 2102. Such user data may be directly provided to data sharing manager 2120 or may be stored in user data database 2108 and accessed by data sharing manager 2120 when certain conditions for data transfer are satisfied.

By acting as an intermediary between co-located sensors for the purposes of data transfer, data sharing manager 2120 facilitates data sharing in a manner that does not require a local link to be established between or among those sensors. As noted above, establishing such a link can be time consuming and burdensome for users. Furthermore, in instances where such local links are more bandwidth-constrained than links to LBS delivery engine 2100, data transfer via LBS delivery engine 2100 may be significantly more efficient than a transfer between sensors over a local communication link.

Also, by acting as an intermediary between co-located sensors for the purposes of data transfer, data sharing manager 2120 allows data to be shared between sensors that would otherwise be incapable of detecting and/or communicating with each other. For example, data sharing manager 2120 can transfer data between and among WiFi devices, cellular telephones and Bluetooth™ devices that would not normally be able to detect or communicate with each other.

Furthermore, by acting as an intermediary between co-located sensors for the purposes of data transfer, data sharing manager 2120 can automatically cause data to be transferred between such devices based on proximity and any of a variety of other factors, such as commonality of user interests and/or activities or membership in a social network. However, because data sharing manager 2120 acts as the intermediary in brokering such transfers it can advantageously implement filters to validate user data and protect user privacy.

One manner by which LBS delivery engine 2100 transfers data between and among sensors in accordance with an embodiment of the present invention will now be described in reference to flowchart 2300 of FIG. 23. Although the steps of flowchart 2300 will be described with continued reference to components of LBS delivery engine 2100, persons skilled in the relevant art(s) will readily appreciate that the method is not limited to those implementations and that other means may be used to carry out the method.

Figure 23:
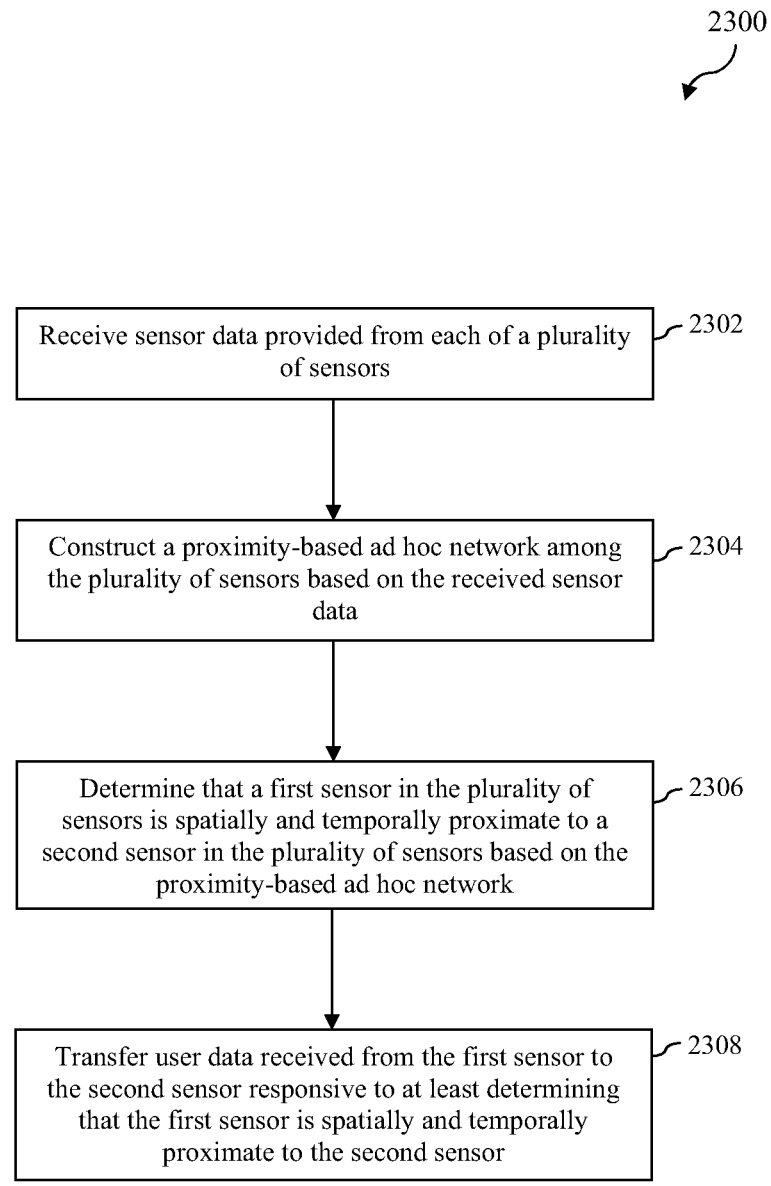
FIG. 23 is a flowchart of a method by which an LBS delivery engine transfers data between and among sensors in accordance with an embodiment of the present invention.

As shown in FIG. 23, the method of flowchart 2300 begins at step 2302, in which communications manager 2106 receives sensor data provided from each of a plurality of sensors. Communications manager 2106 stores this sensor data in sensor logs database 2118, where it is accessible by location tracking manager 2112. At step 2304, location tracking manager 2112 constructs a proximity-based ad hoc network among the plurality of sensors based on the received sensor data. One manner in which location tracking manager 2112 may construct a proximity-based ad hoc network based on the received sensor data was described above in reference to location tracking manager 112 of LBS delivery engine 102, and thus no further description of that process need be provided.

At step 2306, data sharing manager 2120 determines that a first sensor in the plurality of sensors is spatially and temporally proximate to a second sensor in the plurality of sensors based on the proximity-based ad hoc network. In one embodiment, data sharing manager 2120 performs this function by accessing the current graph 2114 of sensor locations, which is maintained by location tracking manager 2112 in a manner described above.

At step 2308, data sharing manager 2120 transfers user data received from the first sensor to the second sensor responsive to at least determining that the first sensor is spatially and temporally proximate to the second sensor. The user data is transferred to the second sensor via sensor network 104.

The user data that is received from the first sensor may be any type of user data including but not limited to any type of text, graphics, audio and/or video content or files. The user data may also include a link or permission to access and optionally modify network-accessible content or data. The user data may be intended for delivery to a single individual or entity or for broadcast to a plurality of individuals or entities. Where the data transfer functionality of LBS delivery engine 2100 is used to introduce proximally-located users for the purposes of building a personal or business relationship, the user data may comprise a user profile, a business card, a classified advertisement, a personals advertisement, a resume, or a help wanted posting. Other examples of user data in the nature of "personal broadcasts" are described in co-owned and commonly pending U.S. patent application Ser. No. 11/957,052, entitled "Personal Broadcast Engine and Network" and filed on Dec. 14, 2007, the entirety of which is incorporated by reference herein.

The user data that is received from the first sensor may be received by communications manager 2106 from sensor network 104 and then provided directly to data sharing manager 2120 for transfer to the second sensor. Alternatively, the user data that is received from the first sensor may be received via user interface 2102 and then stored in user data database 2108. In this case, data sharing manager 2120 accesses the user data stored in user data database 2108 when certain conditions for data transfer are satisfied. The data transfer process may be initiated by a user or a process running on a sensor or LBS delivery engine 2100.

As noted above, data sharing manager 2120 is capable of transferring data between individual sensors as well as broadcasting data from a first sensor to a plurality of other sensors. Thus, in step 2308, transferring the user data received from the first sensor to the second sensor may include transferring the user data to a plurality of sensors that are spatially and temporally proximate to the first sensor.

As also noted above, by acting as an intermediary between co-located sensors for the purposes of data transfer, data sharing manager 2120 allows data to be shared between sensors that would otherwise be incapable of detecting and/or communicating with each other. Thus, in accordance with the method of flowchart 2300, the first sensor may be of a first device type and the second sensor may be of a second device type that is incapable of directly communicating with the first device type. Such device types may include WiFi devices, cellular telephones, and Bluetooth™ devices.

The foregoing method also allows the first and second sensor to share data even when those sensors are not currently capable of detecting each other. For example, location tracking manager 2112 may determine that the first and second sensors are proximally-located by determining that each sensor is proximally-located to a third sensor in the plurality of sensors. This third sensor may be sensed by both the first or second sensors or by sensors that are proximally-located to those sensors. Thus, LBS delivery engine 2100 allows data to be transferred between sensors that are only indirectly connected through a number of intermediate nodes (e.g., sensors or beacons) in the proximity-based ad hoc network constructed and maintained by location tracking manager 2112.

The data transfer between the first sensor and the second sensor in step 2308 may advantageously be conditioned on the identification of relationship between a user of the first sensor and a user of the second sensor. This relationship may be based on user data relating to one or more activities, interests, preferences, and/or social networks associated with each user. Where data transfer is automatic, such filtering allows data to be transferred only to users that share some sort of commonality with the source of the data.

The data transfer between the first sensor and the second sensor in step 2308 may also be conditioned on a determination as to whether the transfer is authorized. This ensures that user privacy is protected. Data sharing manager 2120 may make this determination, for example, based on permissioning rules associated with a user of the first sensor and/or a user of the second sensor. Such permissioning rules may be stored in user data database 2102 and accessed when required by data sharing manager 2120.

Although the foregoing section describes a method for sharing data between proximally-located sensors in a proximity-based ad hoc network, it is noted that the foregoing approach can advantageously be used to share data with or between devices and objects that are configured to or capable of acting as beacons only. So long as such beacons are detected by at least one sensor that is currently reporting sensor data to LBS delivery engine 102, those beacons can also be located within the proximity-based ad hoc network by location tracking manager 212. Consequently, such beacons can then also participate in data sharing activities with other sensors or beacons in the proximity-based ad hoc network in a like manner to that described above.

The foregoing data sharing method can beneficially be used to easily share information with proximally-located users. For example, the foregoing data sharing method can be used to easily share data prepared for or generated during a meeting among the meeting participants, such as meeting notes, audio and/or video recordings, photos, follow-up meeting information, or other data. The method can also be used, for example, to generate invitations or requests to other proximally-located users to connect on any online social network, event, meeting, trip, or the like.

The foregoing data sharing method can advantageously provide users with real-time information about proximally-located people. As a result, the foregoing data sharing method can advantageously be used to obtain information about a person that a user is currently meeting in real time. This may include querying a person's CV online or performing a web search about a person. The foregoing data sharing method can also be used to maintain a history of people encountered by a user over time and to display history information to the user. For example, the history information for a given encounter may include such information as a time, place, duration, event name, event type, or the like.

In accordance with one embodiment of the present invention, the sharing of data with proximally-located users facilitates the creation of a graph of user encounters. For example, a sensor can create a mesh of encounters or connections between all discoverable devices in range. Such encounter information can be used, for example, to provide users with notifications concerning current or past user encounters and/or to build a social graph based on accumulated real world encounters.

In a further embodiment of the present invention, a user may create a tag for a proximally-located person. This tag may then be displayed on a public profile associated with that person. In one implementation, the person must approve of the tag before it is displayed on the public profile.

F. Example Computer System Implementation

Each of the components of the LBS delivery engines and sensors described herein may be implemented alone or in combination by any well-known processor-based computer system. An example of such a computer system 2400 is depicted in FIG. 24.

Figure 24:
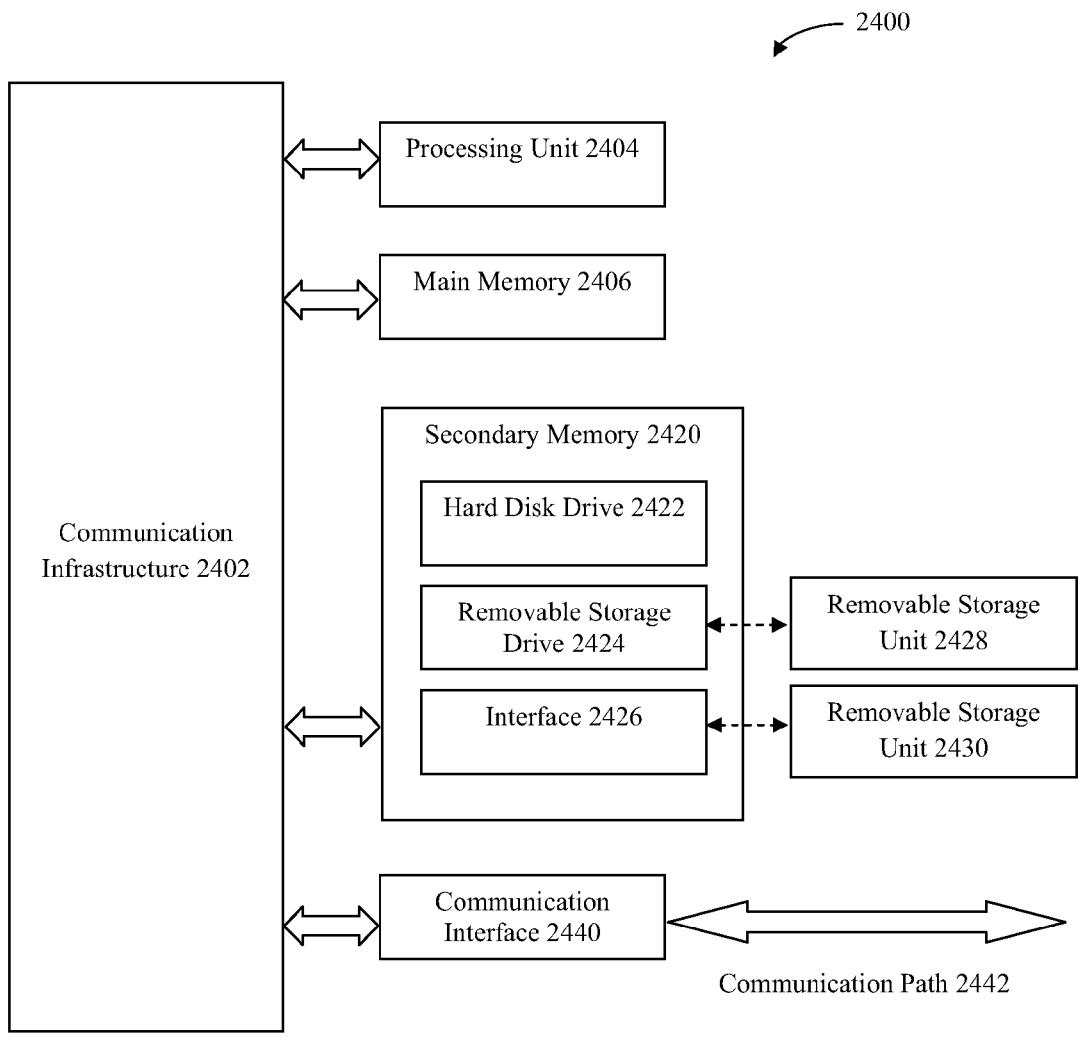
FIG. 24 is a block diagram of an example computer system that may be used to implement aspects of the present invention.

As shown in FIG. 24, computer system 2400 includes a processing unit 2404 that includes one or more processors. Processor unit 2404 is connected to a communication infrastructure 2402, which may comprise, for example, a bus or a network.

Computer system 2400 also includes a main memory 2406, preferably random access memory (RAM), and may also include a secondary memory 2420. Secondary memory 2420 may include, for example, a hard disk drive 2422, a removable storage drive 2424, and/or a memory stick. Removable storage drive 2424 may comprise a floppy disk drive, a magnetic tape drive, an optical disk drive, a flash memory, or the like. Removable storage drive 2424 reads from and/or writes to a removable storage unit 2428 in a well-known manner. Removable storage unit 2428 may comprise a floppy disk, magnetic tape, optical disk, or the like, which is read by and written to by removable storage drive 2424. As will be appreciated by persons skilled in the relevant art(s), removable storage unit 2428 includes a computer usable storage medium having stored therein computer software and/or data.

In alternative implementations, secondary memory 2420 may include other similar means for allowing computer programs or other instructions to be loaded into computer system 2400. Such means may include, for example, a removable storage unit 2430 and an interface 2426. Examples of such means may include a program cartridge and cartridge interface (such as that found in video game devices), a removable memory chip (such as an EPROM, or PROM) and associated socket, and other removable storage units 2430 and interfaces 2426 which allow software and data to be transferred from the removable storage unit 2430 to computer system 2400.

Computer system 2400 may also include a communications interface 2140. Communications interface 2440 allows software and data to be transferred between computer system 2400 and external devices. Examples of communications interface 2440 may include a modem, a network interface (such as an Ethernet card), a communications port, a PCM-CIA slot and card, or the like. Software and data transferred via communications interface 2440 are in the form of signals which may be electronic, electromagnetic, optical, or other signals capable of being received by communications interface 2440. These signals are provided to communications interface 2440 via a communications path 2442. Communications path 2442 carries signals and may be implemented using wire or cable, fiber optics, a phone line, a cellular phone link, an RF link and other communications channels.

As used herein, the terms "computer program medium" and "computer usable medium" are used to generally refer to media such as removable storage unit 2428, removable storage unit 2430, a hard disk installed in hard disk drive 2422, and signals received by communications interface 2440. Computer program medium and computer useable medium can also refer to memories, such as main memory 2406 and secondary memory 2420, which can be semiconductor devices (e.g., DRAMs, etc.). These computer program products are means for providing software to computer system 2400.

Computer programs (also called computer control logic, programming logic, or logic) are stored in main memory 2406 and/or secondary memory 2420. Computer programs may also be received via communications interface 2440. Such computer programs, when executed, enable the computer system 2400 to implement features of the present invention as discussed herein. Accordingly, such computer programs represent controllers of the computer system 2400. Where the invention is implemented using software, the software may be stored in a computer program product and loaded into computer system 2400 using removable storage drive 2424, interface 2426, or communications interface 2440.

The invention is also directed to computer program products comprising software stored on any computer useable medium. Such software, when executed in one or more data processing devices, causes a data processing device(s) to operate as described herein. Embodiments of the present invention employ any computer useable or readable medium, known now or in the future. Examples of computer useable mediums include, but are not limited to, primary storage devices (e.g., any type of random access memory) and secondary storage devices (e.g., hard drives, floppy disks, CD ROMS, zip disks, tapes, magnetic storage devices, optical storage devices, MEMs, nanotechnology-based storage device, etc.).

G. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for correcting time codes generated by a plurality of sensors, comprising:

receiving sensor data from at least one sensor of the plurality of sensors, wherein the sensor data received from the at least one sensor includes a time code generated by the at least one sensor, the time code indicating a time at which the at least one sensor sensed a beacon;

constructing a proximity-based ad hoc network among the plurality of sensors based on the received sensor data;

collectively analyzing time codes generated by a group of spatially proximate sensors in the proximity-based ad hoc network;

modifying a time code generated by at least one sensor in the group based on the collective analysis; and delivering one or more location-based services to at least one of the plurality of sensors, wherein a location tracking manager updates the proximity-based ad hoc network using the modified time code generated by the at least one sensor.

2. The method of claim 1, wherein collectively analyzing the time codes generated by the group comprises assigning a confidence value to each of the time codes generated by the group, and wherein modifying a time code generated by at least one sensor in the group based on the collective analysis comprises:
   selecting one of the time codes generated by the group based on the confidence values; and
   replacing a time code generated by at least one sensor in the group by the selected time code.

3. The method of claim 2, wherein assigning a confidence value to each of the time codes generated by the group comprises:
   assigning a confidence value to each of the time codes generated by the group based at least in part on a number of sensors in the group that generated that time code.

4. The method of claim 2, wherein assigning a confidence value to each of the time codes generated by the group comprises:
   assigning a confidence value to each of the time codes generated by the group based at least in part on an indicator of reliability of a sensor that generated that time code.

5. The method of claim 1, further comprising:
   applying an offset to subsequently-received time codes generated by the at least one sensor in the group.

6. The method of claim 1, further comprising:
   automatically modifying a state of a clock associated with the at least one sensor in the group.

7. The method of claim 1, further comprising:
   notifying a user of the at least one sensor in the group that a state of a clock associated with the at least one sensor should be modified.

8. A system, comprising:
   a communications manager configured to receive sensor data from at least one sensor in a plurality of sensors, wherein the sensor data received from the at least one sensor includes a time code generated by the sensor, the time code indicating a time at which the sensor sensed a beacon;
   a location tracking manager configured to construct a proximity-based ad hoc network among the plurality of sensors based on the received sensor data;
   a time code manager configured to collectively analyze the time codes generated by a group of spatially proximate sensors in the proximity-based ad hoc network and to modify a time code generated by at least one sensor in the group based on the collective analysis; and
   a location-based services delivery engine to deliver location-based services to at least one sensor of the plurality of sensors, wherein the location tracking manager updates the proximity-based ad hoc network using the modified time code generated by the at least one sensor.

9. The system of claim 8, wherein the time code manager is configured to assign a confidence value to each of the time codes generated by the group, to select one of the time codes generated by the group based on the confidence values, and to replace a time code generated by at least one sensor in the group by the selected one of the time codes.

10. The system of claim 9, wherein the time code manager is configured to assign a confidence value to each of the time codes generated by the group based at least in part on a number of sensors in the group that generated each of the time codes.

11. The system of claim 9, wherein the time code manager is configured to assign a confidence value to each of the time codes generated by the group based at least in part on an indicator of the reliability of a sensor that generated that time code.

12. The system of claim 8, wherein the time code manager is further configured to apply an offset to subsequently-received time codes generated by the at least one sensor in the group.

13. The system of claim 8, wherein the time code manager is further configured to automatically modify a state of a clock associated with the at least one sensor in the group.

14. The system of claim 8, wherein the time code manager is further configured to notify a user of the at least one sensor in the group that a state of a clock associated with the at least one sensor should be modified.

15. A method for correcting time codes generated by a plurality of sensors, comprising:
   receiving sensor data from at least one sensor of the plurality of sensors, wherein the sensor data received from at least one sensor includes a time code generated by the at least one sensor, the time code indicating a time at which the at least one sensor sensed a beacon;
   constructing a proximity-based ad hoc network among the plurality of sensors based on the received sensor data;
   determining a geographic location of a first sensor in the proximity-based ad hoc network;
   obtaining local time information based on the geographic location of the first sensor;
   using the local time information to correct a time code generated by a second sensor that is spatially proximate to the first sensor in the proximity-based ad hoc network;
   updating, by a location tracking manager, the proximity-based ad hoc network using the corrected time code generated by the second sensor; and
   delivering one or more location-based services to at least one of the plurality of sensors.

16. The method of claim 15, further comprising:
   applying an offset to subsequently-received time codes generated by the second sensor.

17. The method of claim 15, further comprising:
   automatically modifying a state of a clock associated with the second sensor.

18. The method of claim 15, further comprising:
   notifying a user of the second sensor that a state of a clock associated with the second sensor should be modified.

19. A system, comprising:
   a communications manager configured to receive sensor data from at least one sensor of a plurality of sensors, wherein the sensor data received from the at least one sensor includes a time code generated by the sensor, the time code indicating a time at which the sensor sensed a beacon;
   a location tracking manager configured to construct a proximity-based ad hoc network among the plurality of sensors based on the received sensor data and to determine a geographic location of a first sensor in the proximity-based ad hoc network;
   a time code manager configured to obtain local time information based on the geographic location of the first sensor and to use the local time information to correct a time code generated by a second sensor that is spatially proximate to the first sensor in the proximity-based ad hoc network; and a location-based services delivery engine to deliver location-based services to at least one sensor of the plurality of sensors, wherein the location tracking manager updates the proximity-based ad hoc network using the corrected time code generated by the second sensor.

20. The system of claim 19, wherein the time code manager is further configured to apply an offset to subsequently-received time codes generated by the second sensor.

21. The system of claim 19, wherein the time code manager is further configured to automatically modify a state of a clock associated with the second sensor.

22. The system of claim 19, wherein the time code manager is further configured to notify a user of the second sensor that a state of a clock associated with the second sensor should be modified.

* * * * *